United States Patent
Wei et al.

(10) Patent No.: US 9,549,326 B2
(45) Date of Patent: Jan. 17, 2017

(54) METHODS AND APPARATUSES FOR PROVISION OF A FLEXIBLE TIME SHARING SCHEME ON AN UNLICENSED BAND OF A SYSTEM

(75) Inventors: Na Wei, Beijing (CN); Chunyan Gao, Beijing (CN); Haiming Wang, Beijing (CN); Erlin Zeng, Beijing (CN); Wei Bai, Beijing (CN); Wei Hong, Beijing (CN); Jing Han, Beijing (CN); Gilles Charbit, Farnborough (GB)

(73) Assignee: BROADCOM CORPORATION, Irvine, CA (US)

( * ) Notice: Subject to any disclaimer, the term of this patent is extended or adjusted under 35 U.S.C. 154(b) by 401 days.

(21) Appl. No.: 14/232,328

(22) PCT Filed: Jul. 14, 2011

(86) PCT No.: PCT/CN2011/001167
§ 371 (c)(1),
(2), (4) Date: Sep. 5, 2014

(87) PCT Pub. No.: WO2013/006988
PCT Pub. Date: Jan. 17, 2013

(65) Prior Publication Data
US 2014/0378157 A1    Dec. 25, 2014

(51) Int. Cl.
*H04W 72/00*    (2009.01)
*H04W 16/14*    (2009.01)
(Continued)

(52) U.S. Cl.
CPC ............. *H04W 16/14* (2013.01); *H04W 28/20* (2013.01); *H04W 72/0453* (2013.01);
(Continued)

(58) Field of Classification Search
CPC ...... H04W 16/14; H04W 28/18; H04W 28/20; H04W 28/22; H04W 28/26; H04W 72/0453; H04W 72/1215; H04W 72/1226; H04W 84/12
(Continued)

(56) References Cited

U.S. PATENT DOCUMENTS 5,850,596 A * 12/1998 Reynolds ................. H04B 1/10
                                                              370/480
7,512,094 B1    3/2009 Linebarger et al.
(Continued)

*Primary Examiner* — Jean Gelin
(74) *Attorney, Agent, or Firm* — Oblon, McClelland, Maier & Neustadt, L.L.P.

(57) ABSTRACT

A method, apparatus and computer program product are provided facilitating flexible time sharing among systems. A method and apparatus may generate a secondary component carrier transmission plan including planned on and off durations. The planned on durations correspond to a time period for an apparatus and devices to communicate via an unlicensed band of the secondary component carrier. The planned off durations correspond to a time interval in which the devices may deactivate from the unlicensed band or remain disconnected from the unlicensed band. The method and apparatus may also enable provision of the plan to the devices via a licensed band of a primary component carrier and detecting a medium of the unlicensed band prior to the expiration of the time period to determine whether the medium is available in order to decide whether to turn on transmissions to the unlicensed band after one of the planned off durations.

20 Claims, 17 Drawing Sheets

(51) Int. Cl.
  *H04W 72/04*   (2009.01)
  *H04W 72/12*   (2009.01)
  *H04W 28/20*   (2009.01)
  *H04W 84/12*   (2009.01)
(52) U.S. Cl.
  CPC .... *H04W 72/1215* (2013.01); *H04W 72/1226* (2013.01); *H04W 84/12* (2013.01)
(58) Field of Classification Search
  USPC ......... 455/414.1, 448, 449, 450, 452.1, 454, 455/455, 435.1, 435.2
  See application file for complete search history.

(56) References Cited

U.S. PATENT DOCUMENTS

| | | | |
|---|---|---|---|
| 2005/0025265 A1 | 2/2005 | D'Amico et al. | |
| 2010/0246506 A1 | 9/2010 | Krishnaswamy | |
| 2012/0077510 A1* | 3/2012 | Chen | H04W 28/26 455/452.1 |
| 2012/0129522 A1* | 5/2012 | Kim | H04W 72/0426 455/434 |
| 2013/0143502 A1* | 6/2013 | Kazmi | H04W 88/06 455/62 |
| 2014/0031054 A1* | 1/2014 | Zou | H04W 16/14 455/452.2 |
| 2014/0112289 A1* | 4/2014 | Kim | H04W 16/14 370/329 |

* cited by examiner

FIG. 13

METHODS AND APPARATUSES FOR PROVISION OF A FLEXIBLE TIME SHARING SCHEME ON AN UNLICENSED BAND OF A SYSTEM

TECHNOLOGICAL FIELD

Embodiments of the present invention relate generally to wireless communication technology and, more particularly, to a method, apparatus and computer program product for providing a flexible time sharing mechanism on an unlicensed band of a flexible communications system.

BACKGROUND

Mobile terminals routinely communicate within a licensed spectrum via networks supervised by various cellular operators. The licensed spectrum, however, has a finite capacity and may become somewhat scarce as the number of mobile terminals that are configured to communicate within the licensed spectrum increases at fairly dramatic rates. As the demands placed upon the licensed spectrum by the various mobile terminals begin to saturate the licensed spectrum, the mobile terminals may experience increasing levels of interference or limited resources with the licensed spectrum potentially eventually becoming a bottleneck for such communications. Therefore, it may be necessary to enable cellular operations on license exempt bands as well as in suitable instances to help offload the traffic.

An increasing number of other network topologies are being integrated with cellular networks. However, there may already be some other network system or other cellular operations operating on an unlicensed band. These other network topologies include, for example, wireless fidelity (WiFi) networks, ad hoc networks and various other local area networks. The terminals, either mobile or fixed, supported by these other network topologies may communicate with one another in an unlicensed spectrum, such as a licensed-exempt industrial scientific medical (ISM) radio band. The ISM radio band supports other non-cellular systems, such as WiFi systems operating in accordance with the Institute of Electrical and Electronics Engineers (IEEE) 802.11 standard, ZigBee systems operating in accordance with the IEEE 802.15 standard, Bluetooth systems and universal serial bus (USB) wireless systems. In this regard, the ISM radio band may include the 2.4 GHz ISM band in which WiFi 802.11b and 802.11g systems operate and the 5 GHz ISM band in which WiFi 802.11a systems operate. Though cellular technologies have not generally been deployed in the ISM band, such deployment could be considered for local-area Long Term Evolution (LTE) cellular networks as long as they meet the regulatory requirements in country-specific ISM bands, e.g., Federal Communications Commission (FCC) in the United States. Another example of a license exempt band is TV White Space (TVWS), which has been investigated widely in the recent years due to the large available bandwidths at suitable frequencies (e.g., TV spectrum in the 54-698 MHz range in the U.S.) for different radio applications. In the United States, the FCC has regulated licensed or license-exempt TV bands for the secondary-system applications, e.g., cellular, WiFi, WiMax, etc., on TV Band Devices (TVBD).

In an instance in which an LTE system is deployed in a licensed band, the LTE system is typically designed for continuous transmission, since a corresponding network operator may need to buy a certain spectrum for the network operator's usage. However, in order to deploy an LTE system in a shared band without any modification, the LTE system may generally occupy the spectrum all the time, and may totally, or partially, block any other system's usage, which may be unfair and may violate a regulatory requirement of an unlicensed band.

BRIEF SUMMARY OF EXAMPLE EMBODIMENTS

A method, apparatus and computer program product are therefore provided in accordance with an example embodiment to facilitate the establishment of communications, such as non-cellular communications or cellular communications in a license exempt band. In this regard, some example embodiments may enable provision of time sharing in a flexible manner on unlicensed band of a secondary cell carrier in an instance in which one or more other systems may be deployed in same band (e.g., the unlicensed band). In an example embodiment, provision of a flexible time sharing scheme may be performed in a carrier aggregation system (e.g., a LTE carrier aggregation system) utilizing licensed band carriers as well as unlicensed band carriers. As such, some example embodiments may facilitate optional coexistence of systems.

In one example embodiment, a method is provided that generates a secondary component carrier transmission plan including one or more planned on durations and one or more planned off durations. The planned on durations may correspond to a time period for an apparatus and one or more devices to communicate via an unlicensed band on the secondary component carrier. Additionally, the planned off durations may correspond to a time interval in which the devices may deactivate from the unlicensed band or remain disconnected from the unlicensed band. The method may further include enabling provision of the plan to the devices via a licensed band of a primary component carrier. The method may further include detecting a medium of the unlicensed band prior to the expiration of the time period to determine whether the medium is available in order to decide whether to turn on transmissions to the unlicensed band after at least one of the planned off durations.

In another example embodiment, an apparatus is provided that includes at least one processor and at least one memory including computer program code with the at least one memory and the computer program code being configured to, with the at least one processor cause the apparatus at least to generate a secondary component carrier transmission plan including one or more planned on durations and one or more planned off durations. The planned on durations may correspond to a time period for the apparatus and one or more devices to communicate via an unlicensed band on the secondary component carrier. Additionally, the planned off durations may correspond to a time interval in which the devices may deactivate from the unlicensed band or remain disconnected from the unlicensed band. The at least one memory and the computer program code are also configured to, with the at least one processor, cause the apparatus to enable provision of the plan to the devices via a licensed band of a primary component carrier. The at least one memory and the computer program code are also configured to, with the at least one processor, cause the apparatus to detect a medium of the unlicensed band prior to the expiration of the time period to determine whether the medium is available in order to decide whether to turn on transmissions to the unlicensed band after at least one of the planned off durations.

In yet another example embodiment, a method is provided that includes receiving a generated secondary component carrier transmission plan including one or more planned on durations and one or more planned off durations. The planned on durations may correspond to a time period for an apparatus and one or more devices to communicate via an unlicensed band of the secondary component carrier. Additionally, the planned off durations may correspond to a time interval in which the devices may deactivate from the unlicensed band or remain disconnected from the unlicensed band. The method may further include receiving at least one indication specifying whether transmissions to the unlicensed band are turned on after at least one of the planned off durations. The generated plan may be received via a licensed band of the primary component carrier.

In yet another example embodiment, an apparatus is provided that includes at least one processor and at least one memory including computer program code with the at least one memory and the computer program code being configured to, with the at least one processor, cause the apparatus at least to receive a generated secondary component carrier transmission plan including one or more planned on durations and one or more planned off durations. The planned on durations may correspond to a time period for a network device and one or more devices to communicate via an unlicensed band of the secondary component carrier. Additionally, the planned off durations may correspond to a time interval in which the devices may deactivate from the unlicensed band or remain disconnected from the unlicensed band. The at least one memory and the computer program code are also configured to, with the at least one processor, cause the apparatus to receive at least one indication specifying whether transmissions to the unlicensed band are turned on after at least one of the planned off durations. The generated plan may be received via a licensed band of the primary component carrier.

BRIEF DESCRIPTION OF THE SEVERAL VIEWS OF THE DRAWINGS

Figure 1:
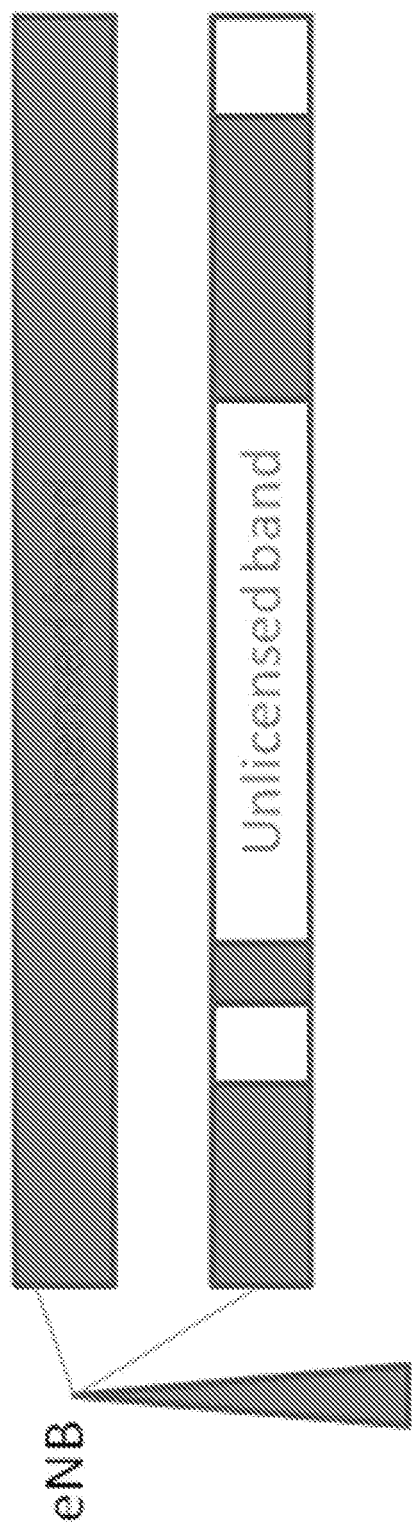
Figure 2:
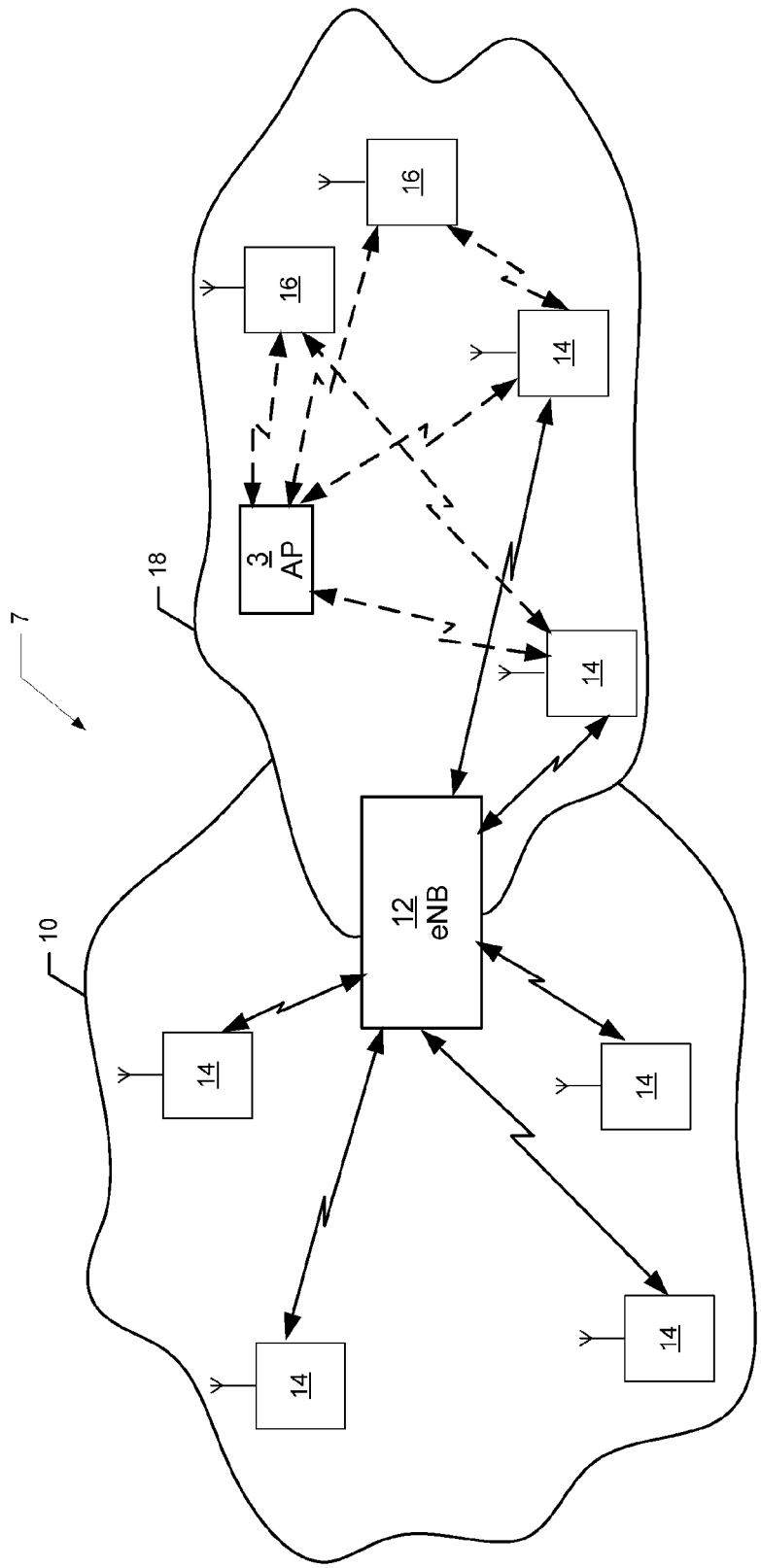
Figure 3:
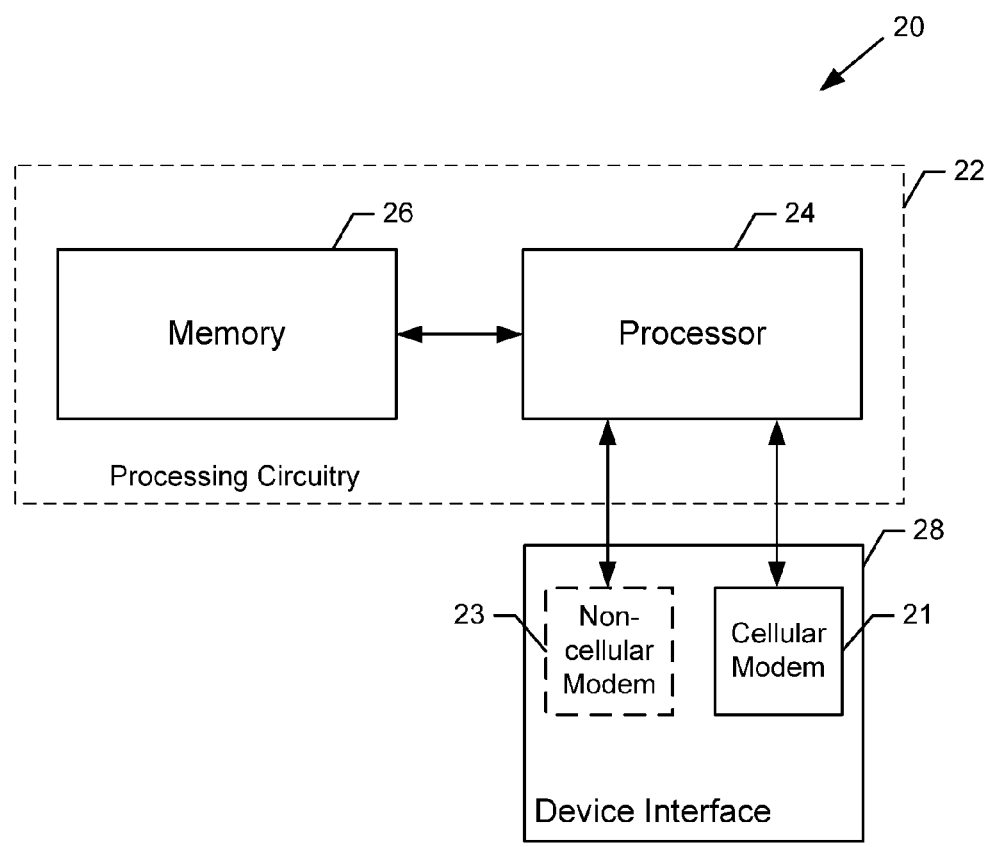
Figure 4:
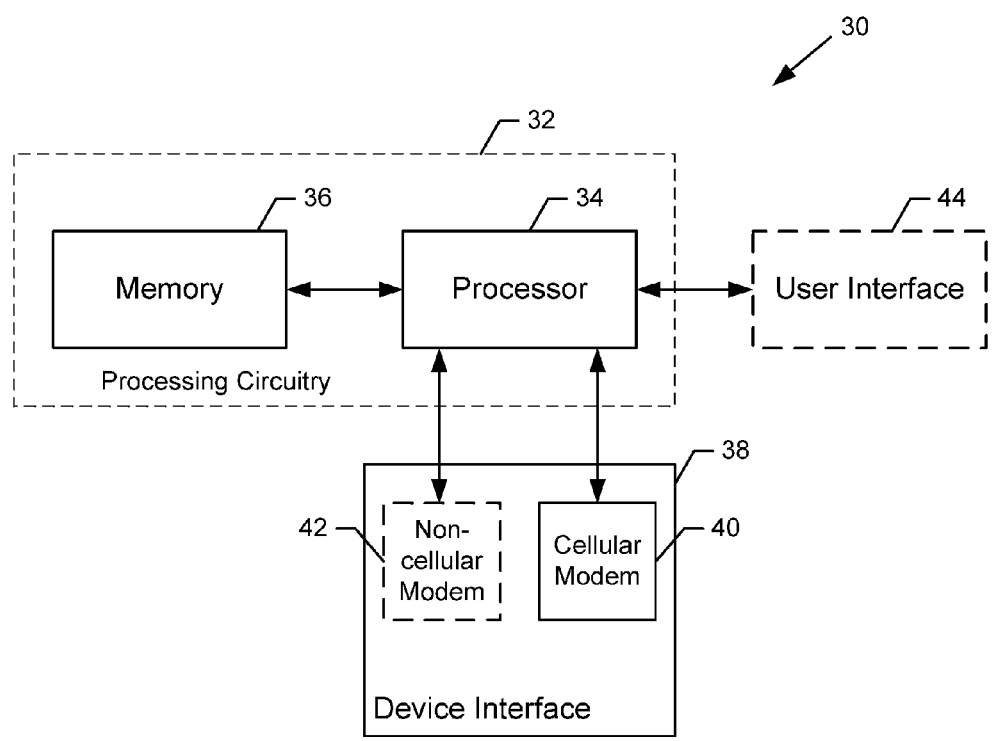
Figure 5:
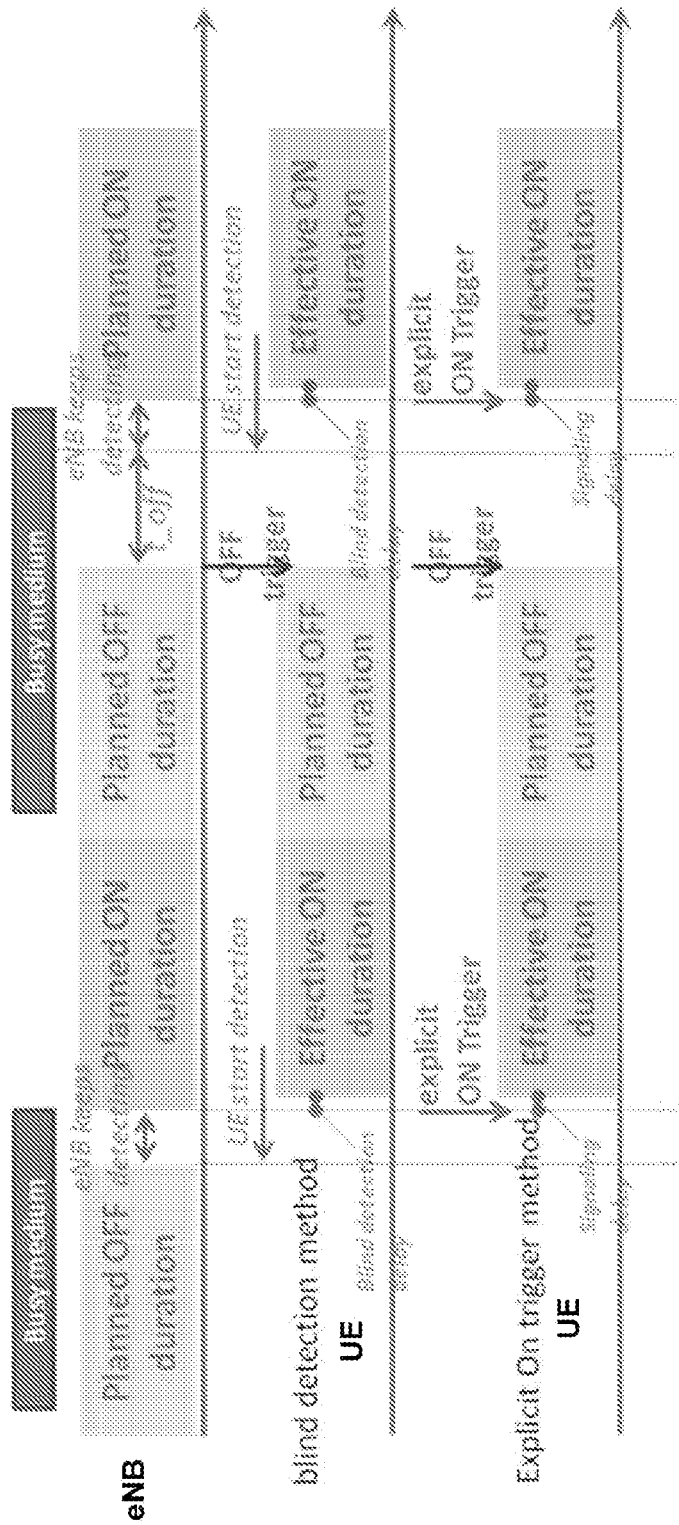
Figure 6:
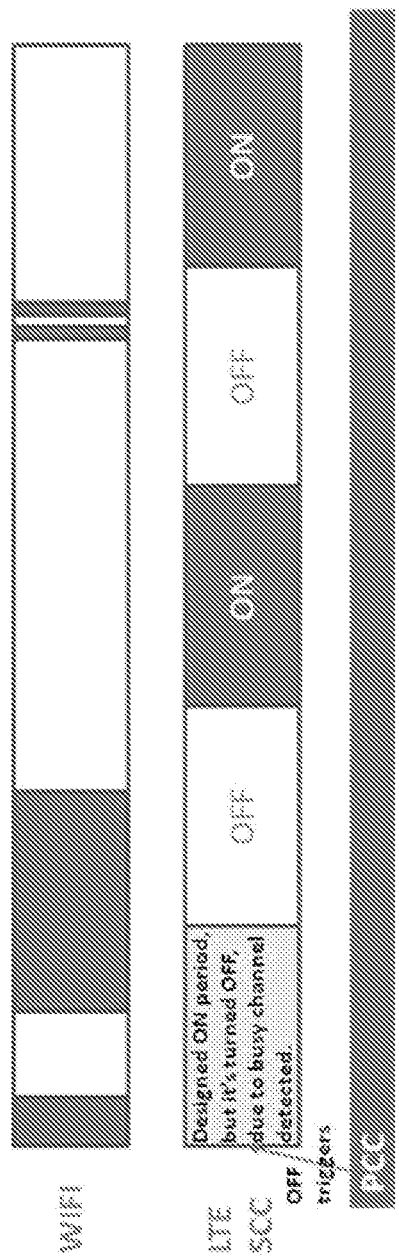
Figure 7:
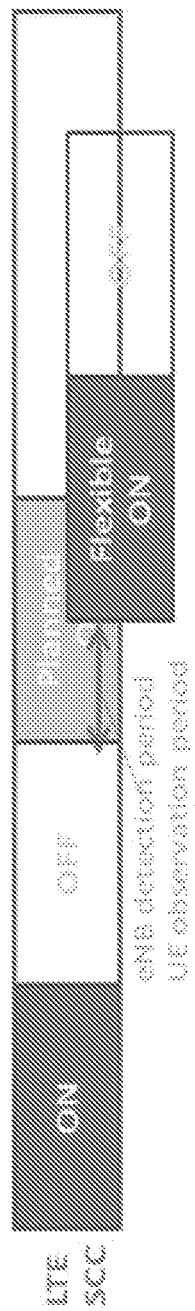
Figure 8:
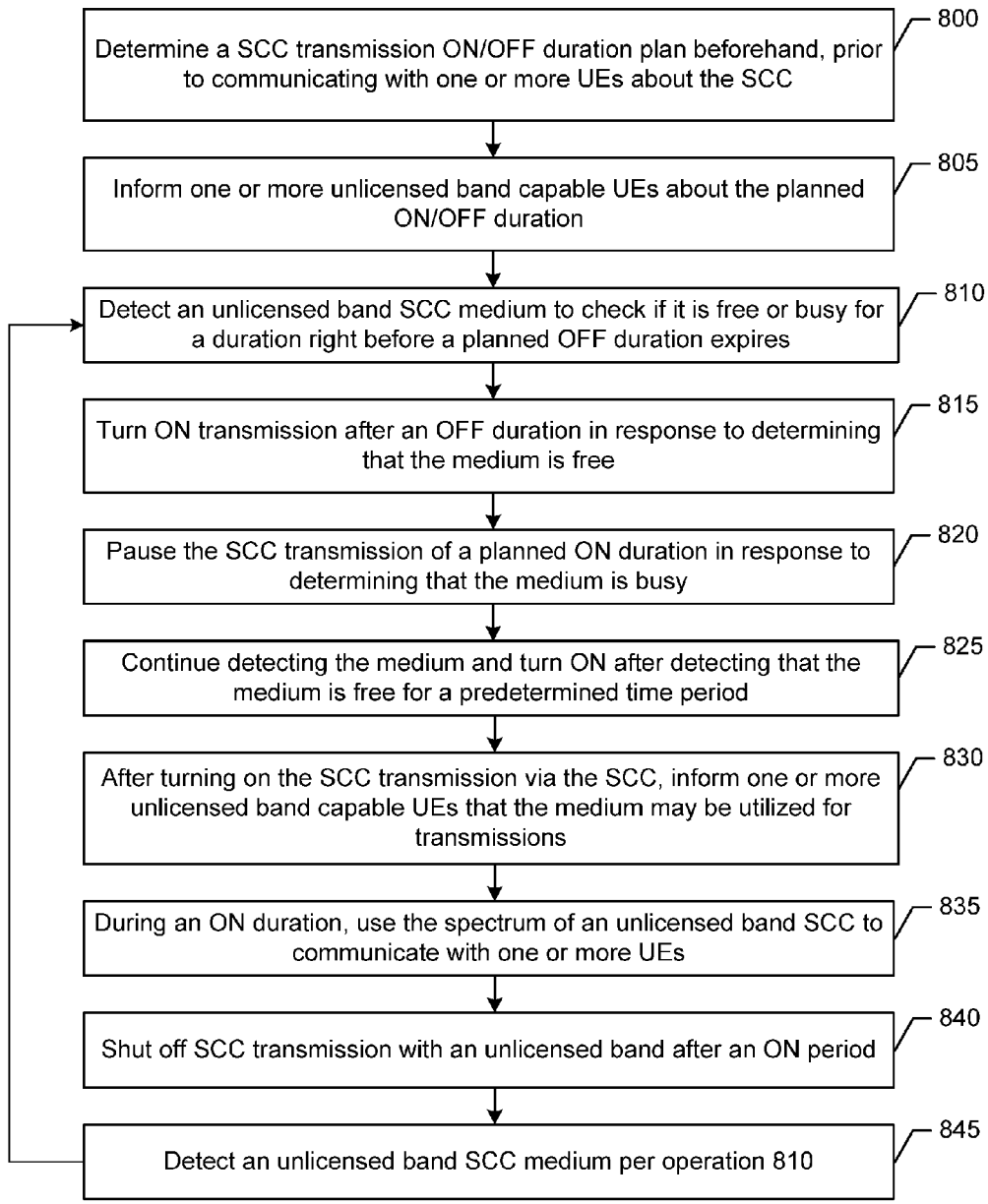
Figure 9:
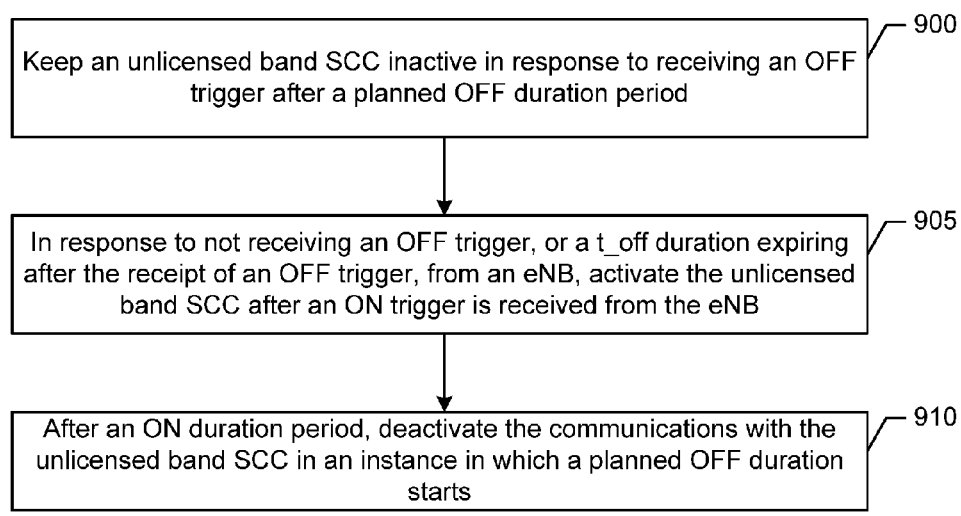
Figure 10:
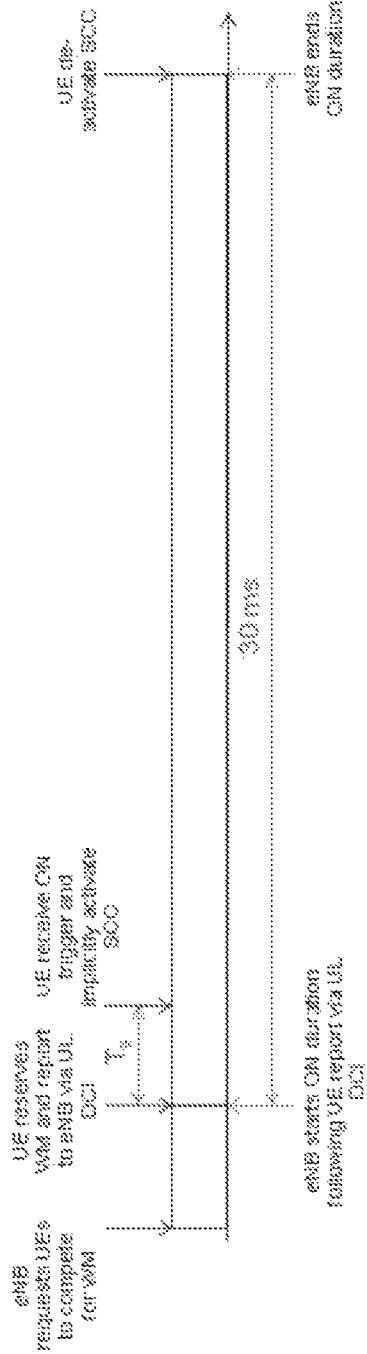
Figure 11:
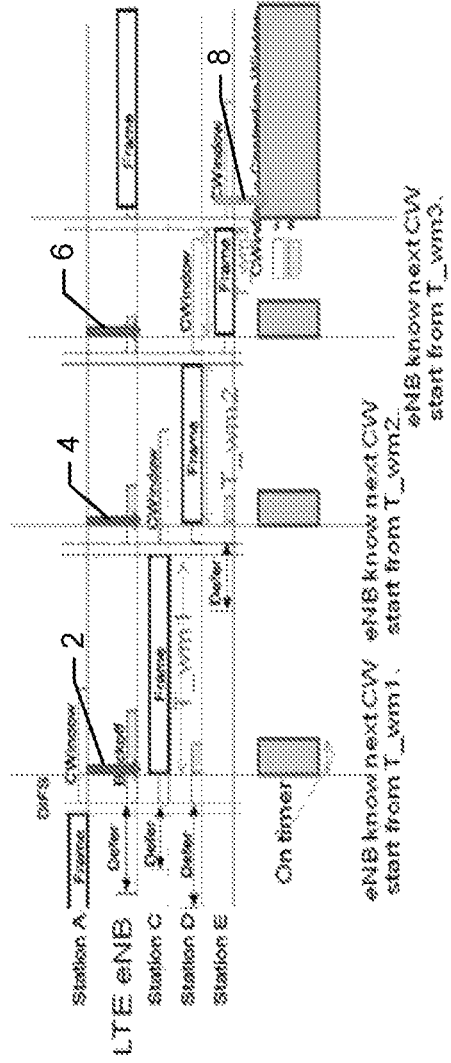
Figure 12:
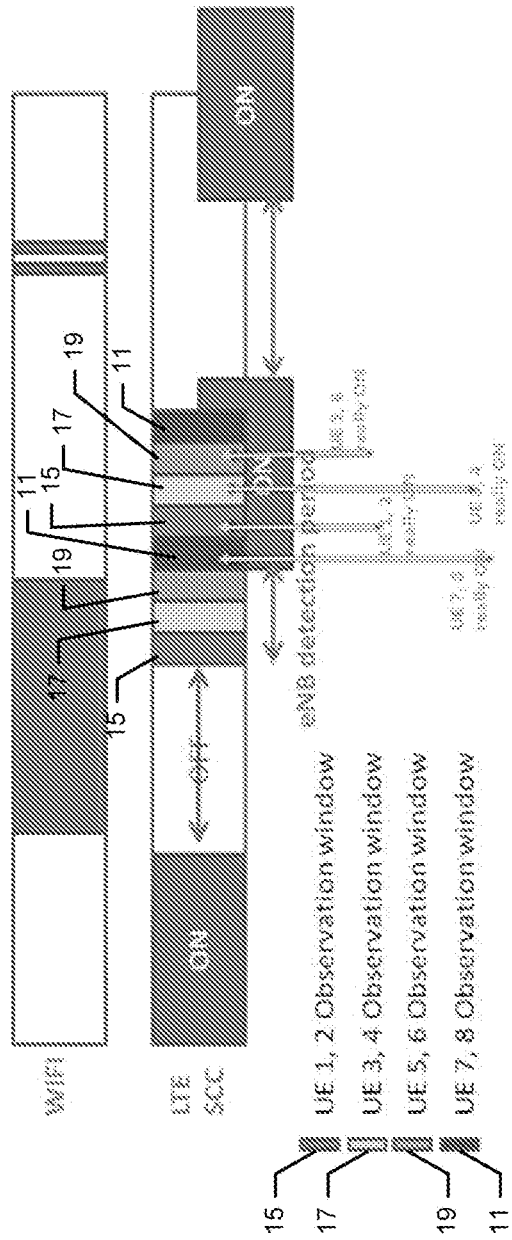
Figure 14:
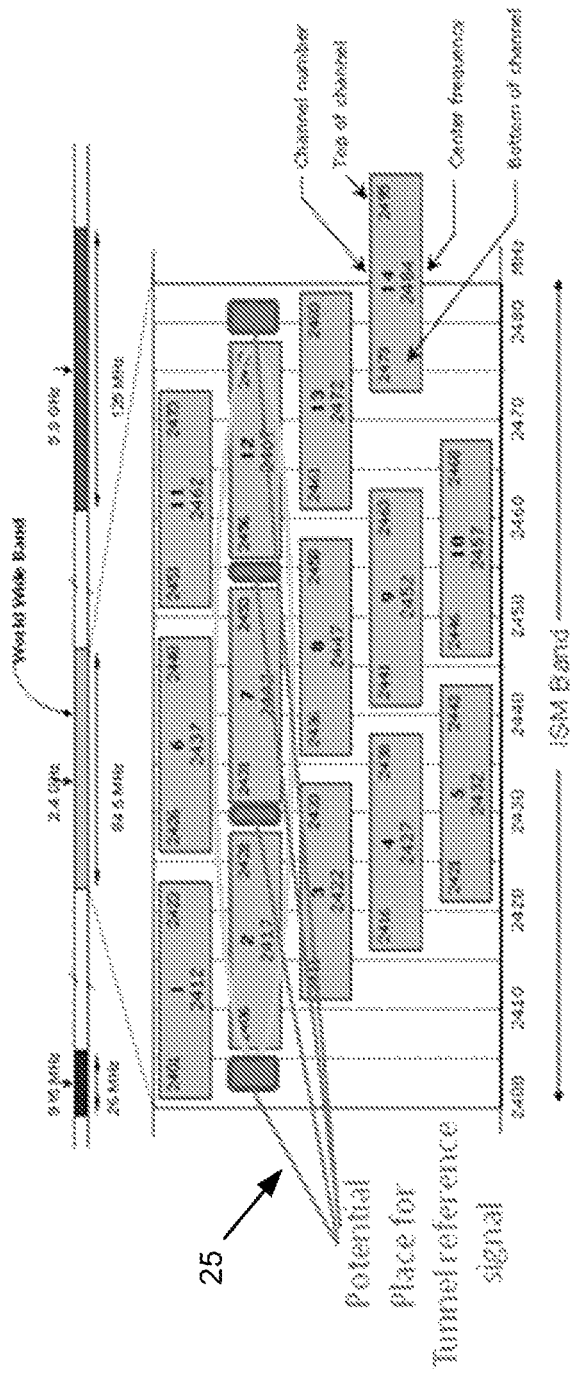
Figure 15A:
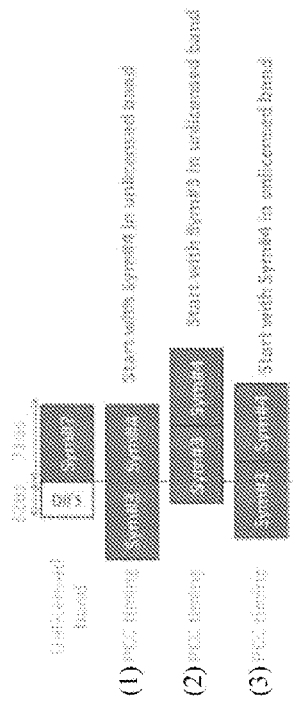
Figure 15B:
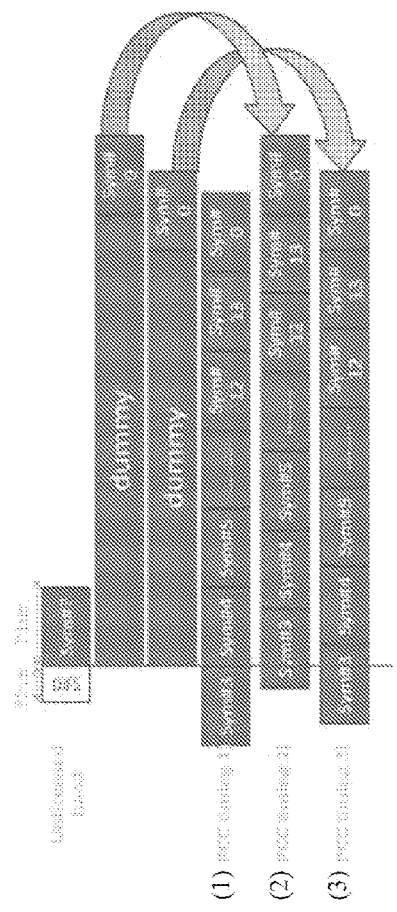
Figure 16:
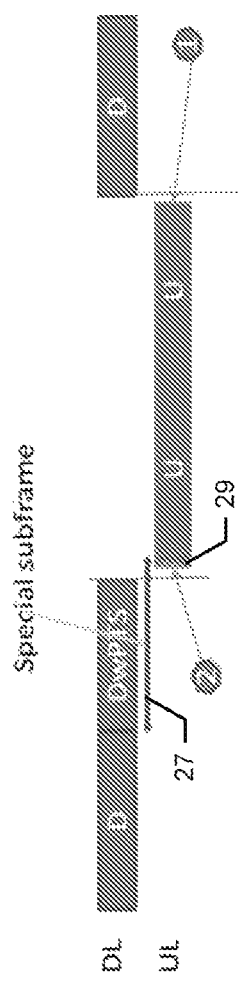
Figure 17:
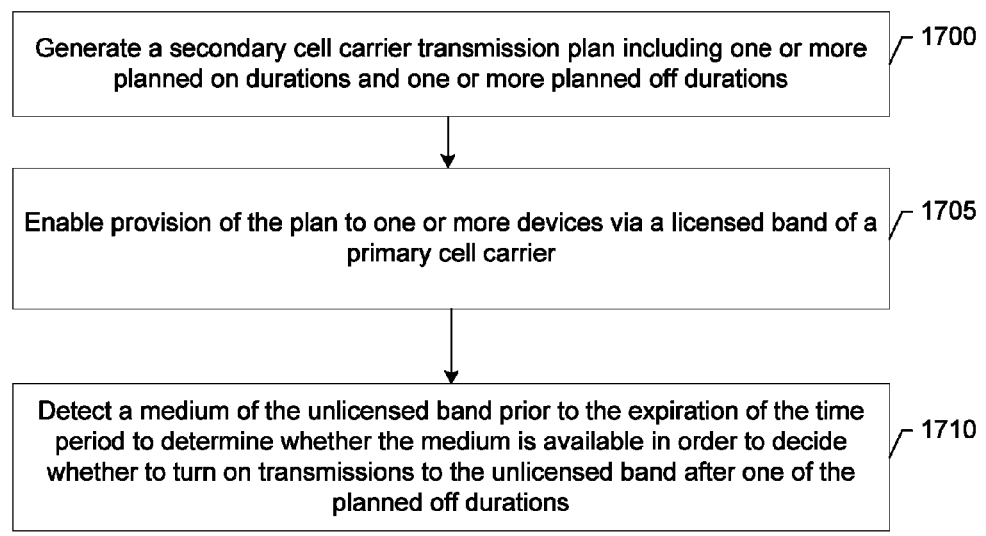

Having thus described the invention in general terms, reference will now be made to the accompanying drawings, which are not necessarily drawn to scale, and wherein:

FIG. 1 is one example of a communications system according to an embodiment of the invention;

FIG. 2 is a diagram of a system according to an example embodiment of the invention;

FIG. 3 is a schematic block diagram of an apparatus from the perspective of a base station in accordance with an example embodiment of the invention;

FIG. 4 is a block diagram of an apparatus from the perspective of a terminal in accordance with an example embodiment of the invention;

FIG. 5 is a diagram illustrating a time sharing scheme on an unlicensed band according to an example embodiment;

FIG. 6 is a diagram illustrating a fixed on/off pattern of a system according to an example embodiment;

FIG. 7 is a diagram illustrating a flexible on/off pattern of a system according to an example embodiment;

FIG. 8 illustrates a flowchart for enabling provision of time sharing on an unlicensed band in a flexible manner from the perspective of a base station according to an example embodiment;

FIG. 9 illustrates a flowchart for enabling provision of time sharing on an unlicensed band in a flexible manner from the perspective of a terminal according to an example embodiment;

FIG. 10 illustrates a diagram of a terminal assisted wireless medium resource reservation according to an example embodiment;

FIG. 11 illustrates a diagram of contention windows according to an example embodiment;

FIG. 12 illustrates a diagram of a configuration of terminal observation windows according to an example embodiment;

Figure 13:
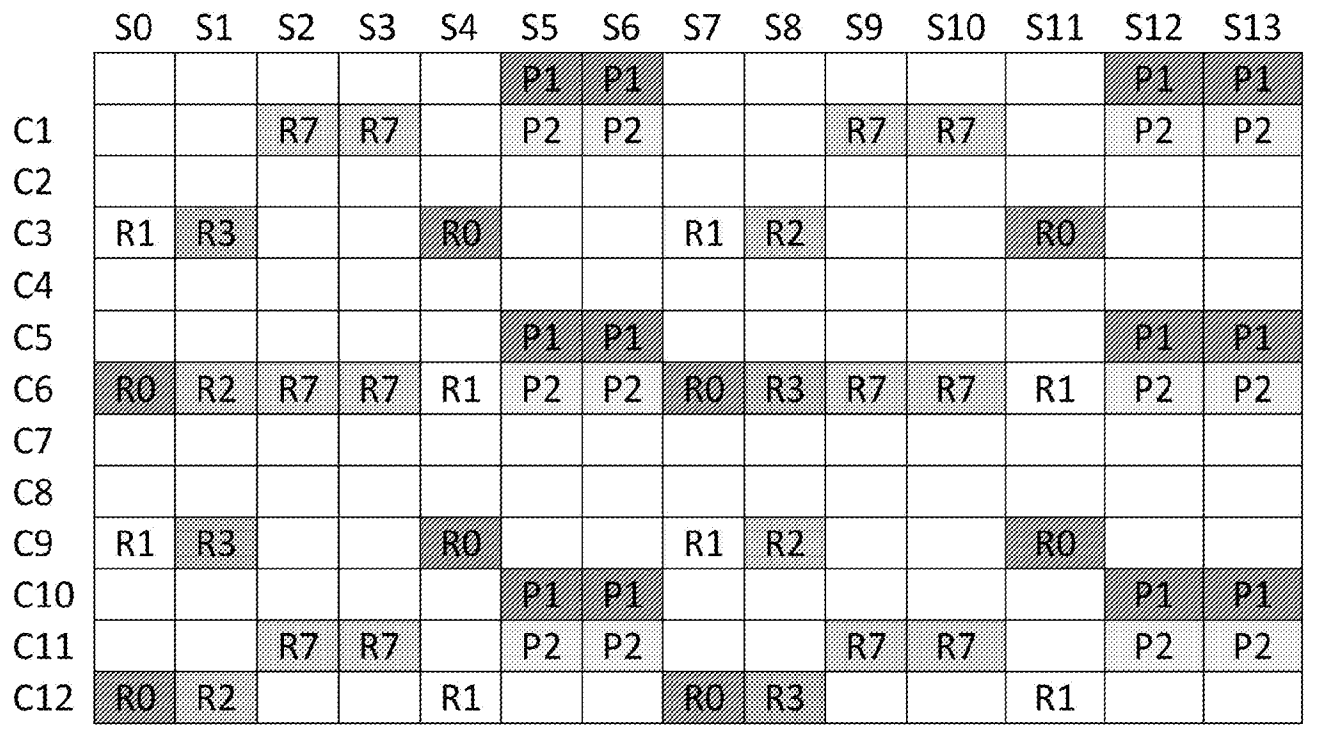

FIG. 13 illustrates a diagram of a starting subframe according to an example embodiment;

FIG. 14 illustrates a diagram for transmitting tunnel reference signals in the gaps of channels according to an example embodiment;

FIGS. 15A and 15B illustrate diagrams of time alignment for starting subframes according to an example embodiment;

FIG. 16 illustrates a diagram of a time division duplex data frame structure according to an example embodiment; and FIG. 17 is a flowchart for enabling provision of time sharing on an unlicensed band in a flexible manner according to an example embodiment.

DETAILED DESCRIPTION

Some embodiments of the present invention will now be described more fully hereinafter with reference to the accompanying drawings, in which some, but not all embodiments of the invention are shown. Indeed, various embodiments of the invention may be embodied in many different forms and should not be construed as limited to the embodiments set forth herein; rather, these embodiments are provided so that this disclosure will satisfy applicable legal requirements. Like reference numerals refer to like elements throughout.

As used in this application, the term 'circuitry' refers to all of the following: (a) hardware-only circuit implementations (such as implementations in only analog and/or digital circuitry) and (b) to combinations of circuits and software (and/or firmware), such as (as applicable): (i) to a combination of processor(s) or (ii) to portions of processor(s)/software (including digital signal processor(s)), software, and memory(ies) that work together to cause an apparatus, such as a mobile phone or server, to perform various functions) and (c) to circuits, such as a microprocessor(s) or a portion of a microprocessor(s), that require software or firmware for operation, even if the software or firmware is not physically present.

This definition of 'circuitry' applies to all uses of this term in this application, including in any claims. As a further example, as used in this application, the term "circuitry" would also cover an implementation of merely a processor (or multiple processors) or portion of a processor and its (or their) accompanying software and/or firmware. The term "circuitry" would also cover, for example and if applicable to the particular claim element, a baseband integrated circuit or applications processor integrated circuit for a mobile phone or a similar integrated circuit in server, a cellular network device, or other network device.

As defined herein a "computer-readable storage medium," which refers to a non-transitory, physical or tangible storage medium (e.g., volatile or non-volatile memory device), may be differentiated from a "computer-readable transmission medium," which refers to an electromagnetic signal.

In accordance with an example embodiment of the present invention, a communication system is provided in which a network entity, such as an access point, a base station, an eNB or the like, may utilize carrier aggregation and in this regard may communicate with a licensed band carrier(s) as well as an unlicensed band carrier(s), as shown in FIG. 1.

In this regard, the base station, an evolved node B (eNB) 12 (also referred to herein as a base station 12) or the like, may communicate with a plurality of terminals in the licensed spectrum and may optionally communicate in a license exempt band 18 (also referred to herein as unlicensed band 18), such as within the ISM band or the TVWS band. While a communications system that provides coordination of communication using carrier aggregation in a licensed band and an unlicensed band may be configured in various different manners, FIG. 2 illustrates a generic system diagram in which a terminal, such as a mobile terminal, may communicate in a licensed spectrum, as well as in license exempt band 18, with the network 10, such as by the exchange of cellular signals as shown in the solid lightening bolts in FIG. 2. In addition, the mobile terminal may communicate in a license exempt band 18, such as, but not limited to, the ISM band and/or TVWS, and in the license exempt band there may be other terminals/networks communicating with each other as shown in the dashed lightening bolts. As shown in FIG. 2, an embodiment of a system 7 in accordance with an example embodiment of the invention may include a set of first terminals 14 and a set of second terminals 16. The first terminals 14 may each be capable of communication, such as cellular communication, in the licensed band, as well as in the license exempt band, with a network 10 (e.g., a cellular network). Some terminals 16 may form another network, which may be a cellular system(s) or non-cellular system(s). The first terminals 14 may be configured to communicate (e.g., directly) with one or more of the second terminals 16 as well as at least one access point (AP) 3 (e.g., a Wifi AP, a wireless local area network (WLAN) AP) in a license exempt band 18. The first terminals 14 may be configured to listen to signaling on the license exempt band 18. While each set of the first and second terminals is shown to include multiple terminals, either set or both sets may include a single terminal in other embodiments. While the cellular network may be configured in accordance with Long Term Evolution (LTE), the network may employ other mobile access mechanisms such as wideband code division multiple access (W-CDMA), CDMA2000, global system for mobile communications (GSM), general packet radio service (GPRS), LTE-Advanced (LTE-A) and/or the like. The non-cellular network may be configured in IEEE 802.11 systems or other shared band technologies.

The network 10 may include a collection of various different nodes, devices or functions that may be in communication with each other via corresponding wired and/or wireless interfaces. As such, the illustration of FIG. 2 should be understood to be an example of a broad view of certain elements of the system and not an all inclusive or detailed view of the system or the network. One or more communication terminals such as the first terminals 14 and second terminals 16 may be in communication with each other or other devices via the licensed band of the network 10 and/or the unlicensed band 18. In some cases, each of the communication terminals may include an antenna or antennas for transmitting signals to and for receiving signals from an access point (e.g., AP 3), base station, node B, eNB (e.g., eNB 12) or the like. Although one eNB 12 and on AP 3 is shown as part of the system of FIG. 2, it should be pointed out that any suitable number of eNBs 12 and APs 3 may be part of the system of FIG. 2 without departing from the spirit and scope of the invention. The eNB may be, for example, part of one or more cellular or mobile networks or public land mobile networks (PLMNs). In turn, other devices such as processing devices (e.g., personal computers, server computers or the like) may be coupled to the terminals via the network.

In some example embodiments, the first terminals 14 may be one or more mobile communication devices (e.g., user equipment (UE)) such as, for example, a mobile telephone, portable digital assistant (PDA), pager, laptop computer, or any of numerous other hand held or portable communication devices, computation devices, content generation devices, content consumption devices, or combinations thereof. Alternatively, the first terminals may be fixed communication devices that are not configured to be mobile or portable. In either instance, the terminals may include one or more processors that may define processing circuitry either alone or in combination with one or more memories. The processing circuitry may utilize instructions stored in the memory to cause the terminals to operate in a particular way or execute specific functionality when the instructions are executed by the one or more processors. The first terminals may also include communication circuitry and corresponding hardware/software to enable communication with other devices.

The second terminals 16 may be communication devices such as, for example, a WiFi station, a WLAN station (according to a WLAN technique such as, for example, IEEE 802.11 techniques), a Bluetooth station or the like(s)). The second terminals may be configured to communicate with the AP 3 (e.g., a Wifi AP, a WLAN AP) as well as the first terminals 14.

The eNB 12 may be embodied as or otherwise include an apparatus 20 as generically represented by the block diagram of FIG. 3. In this regard, the apparatus may be configured to communicate with the sets of first and second terminals 14, 16. While one embodiment of the apparatus is illustrated and described below, it should be noted that the components, devices or elements described below may not be mandatory and thus some may be omitted in certain embodiments. Additionally, some embodiments may include further or different components, devices or elements beyond those shown and described herein.

As shown in FIG. 3, the apparatus 20 may include or otherwise be in communication with processing circuitry 22 that is configurable to perform actions in accordance with example embodiments described herein. The processing circuitry may be configured to pertain data processing, application execution and/or other processing and management services according to an example embodiment of the invention. In some example embodiments, the apparatus or the processing circuitry may be embodied as a chip or chip set. In other words, the apparatus or the processing circuitry may comprise one or more physical packages (e.g., chips) including materials, components and/or wires on a structural assembly (e.g., a baseboard). The structural assembly may provide physical strength, conservation of size, and/or limitation of electrical interaction for component circuitry included thereon. The apparatus or the processing circuitry may therefore, in some cases, be configured to implement an embodiment of the present invention on a single chip or as a single "system on a chip." As such, in some cases, a chip or chipset may constitute means for performing one or more operations for providing the functionalities described herein.

In an example embodiment, the processing circuitry 22 may include a processor 24 and memory 26 that may be in communication with or otherwise control a device interface 28. As such, the processing circuitry may be embodied as a circuit chip (e.g., an integrated circuit chip) configured (e.g., with hardware, software or a combination of hardware and software) to perform operations described herein in relation to the eNB 12.

The device interface 28 may include one or more interface mechanisms for enabling communication with other devices, such as the sets of first and second terminals 14, 16. In some cases, the device interface may be any means such as a device or circuitry embodied in either hardware, or a combination of hardware and software that is configured to receive and/or transmit data from/to a network and/or any other device or module in communication with the processing circuitry 22. In this regard, the device interface may include, for example, an antenna (or multiple antennas) and supporting hardware and/or software for enabling communications with a wireless communication network and/or a communication modem, such as a cellular modem 21 (e.g., an LTE modem), and/or an optional non-cellular modem 23 (e.g., a Wifi modem, WLAN modem, etc.) for enabling communications with the sets of first and second terminals. In an example embodiment the cellular modem 21 may be configured to facilitate communications via a primary cell (PCell) on a licensed band (for example, of network 10) and the non-cellular modem 23 may be able to facilitate communications via a secondary cell (SCell) on the unlicensed band 18.

In an example embodiment, the memory 26 may include one or more non-transitory memory devices such as, for example, volatile and/or non-volatile memory that may be either fixed or removable. The memory may be configured to store information, data, applications, instructions or the like for enabling the apparatus 20 to carry out various functions in accordance with example embodiments of the present invention. For example, the memory could be configured to buffer input data for processing by the processor 24. Additionally or alternatively, the memory could be configured to store instructions for execution by the processor. As yet another alternative, the memory may include one of a plurality of databases that may store a variety of files, contents or data sets. Among the contents of the memory, applications may be stored for execution by the processor in order to carry out the functionality associated with each respective application. In some cases, the memory may be in communication with the processor via a bus for passing information among components of the apparatus.

The processor 24 may be embodied in a number of different ways. For example, the processor may be embodied as various processing means such as one or more of a microprocessor or other processing element, a coprocessor, a controller or various other computing or processing devices including integrated circuits such as, for example, an ASIC (application specific integrated circuit), an FPGA (field programmable gate array), or the like. In an example embodiment, the processor may be configured to execute instructions stored in the memory 26 or otherwise accessible to the processor. As such, whether configured by hardware or by a combination of hardware and software, the processor may represent an entity (e.g., physically embodied in circuitry—in the form of processing circuitry 22) capable of performing operations according to embodiments of the present invention while configured accordingly. Thus, for example, when the processor is embodied as an ASIC, FPGA or the like, the processor may be specifically configured hardware for conducting the operations described herein. Alternatively, as another example, when the processor is embodied as an executor of software instructions, the instructions may specifically configure the processor to perform the operations described herein.

In one embodiment, the first terminals 14 (also referred to herein as user equipment (UE) 14) may be embodied as or otherwise include an apparatus 30 as generically represented by the block diagram of FIG. 4. In this regard, the apparatus may be configured to provide for communications in the licensed spectrum, such as cellular communications, with the eNB 12 or another terminal and communications in the license exempt band, such as non-cellular communications, with another terminal (e.g., second terminal 16). While the apparatus may be employed, for example, by a mobile terminal, it should be noted that the components, devices or elements described below may not be mandatory and thus some may be omitted in certain embodiments. Additionally, some embodiments may include further or different components, devices or elements beyond those shown and described herein.

As shown in FIG. 4, the apparatus 30 may include or otherwise be in communication with processing circuitry 32 that is configurable to perform actions in accordance with example embodiments described herein. The processing circuitry may be configured to perform data processing, application execution and/or other processing and management services according to an example embodiment of the present invention. In some embodiments, the apparatus or the processing circuitry may be embodied as a chip or chip set. In other words, the apparatus or the processing circuitry may comprise one or more physical packages (e.g., chips) including materials, components and/or wires on a structural assembly (e.g., a baseboard). The structural assembly may provide physical strength, conservation of size, and/or limitation of electrical interaction for component circuitry included thereon. The apparatus or the processing circuitry may therefore, in some cases, be configured to implement an embodiment of the present invention on a single chip or as a single "system on a chip." As such, in some cases, a chip or chipset may constitute means for performing one or more operations for providing the functionalities described herein.

In an example embodiment, the processing circuitry 32 may include a processor 34 and memory 36 that may be in communication with or otherwise control a device interface 38 and, in some cases, a user interface 44. As such, the processing circuitry may be embodied as a circuit chip (e.g., an integrated circuit chip) configured (e.g., with hardware, software or a combination of hardware and software) to perform operations described herein. However, in some embodiments taken in the context of the mobile terminal, the processing circuitry may be embodied as a portion of a mobile computing device or other mobile terminal.

The optional user interface 44 may be in communication with the processing circuitry 32 to receive an indication of a user input at the user interface and/or to provide an audible, visual, mechanical or other output to the user. As such, the user interface in the context of a mobile terminal may include, for example, a keyboard, a mouse, a joystick, a display, a touch screen, a microphone, a speaker, and/or other input/output mechanisms.

The device interface 38 may include one or more interface mechanisms for enabling communication with other devices and/or networks. In some cases, the device interface may be any means such as a device or circuitry embodied in either hardware, or a combination of hardware and software that is configured to receive and/or transmit data from/to a network and/or any other device or module in communication with the processing circuitry 32. In this regard, the device interface may include, for example, an antenna (or multiple antennas) and supporting hardware and/or software for enabling communications with a wireless communication network and/or a communication modem or other hardware/software for supporting communication via cable, digital subscriber line (DSL), universal serial bus (USB), Ethernet or other methods. In the illustrated embodiment, for example, the device interface includes a cellular modem 40 (e.g., an LTE modem) for supporting communications in the licensed spectrum, such as communications with the eNB 12, and an optional non-cellular modem 42 (e.g., a Wifi modem, WLAN modem, Bluetooth (BT) modem, etc.) for supporting communications in the license exempt band 18, such as non-cellular communications, e.g., communications in the ISM band and/or the TVWS band, with other terminals (e.g., second terminals 16 (e.g., a Wifi station(s), a WLAN station(s)), etc.).

In an example embodiment, the memory 36 may include one or more non-transitory memory devices such as, for example, volatile and/or non-volatile memory that may be either fixed or removable. The memory may be configured to store information, data, applications, instructions or the like for enabling the apparatus 30 to carry out various functions in accordance with example embodiments of the present invention. For example, the memory could be configured to buffer input data for processing by the processor 34. Additionally or alternatively, the memory could be configured to store instructions for execution by the processor. As yet another alternative, the memory may include one of a plurality of databases that may store a variety of files, contents or data sets. Among the contents of the memory, applications may be stored for execution by the processor in order to carry out the functionality associated with each respective application. In some cases, the memory may be in communication with the processor via a bus for passing information among components of the apparatus.

The processor 34 may be embodied in a number of different ways. For example, the processor may be embodied as various processing means such as one or more of a microprocessor or other processing element, a coprocessor, a controller or various other computing or processing devices including integrated circuits such as, for example, an ASIC, an FPGA or the like. In an example embodiment, the processor may be configured to execute instructions stored in the memory 36 or otherwise accessible to the processor. As such, whether configured by hardware or by a combination of hardware and software, the processor may represent an entity (e.g., physically embodied in circuitry—in the form of processing circuitry 32) capable of performing operations according to embodiments of the present invention while configured accordingly. Thus, for example, when the processor is embodied as an ASIC, FPGA or the like, the processor may be specifically configured hardware for conducting the operations described herein. Alternatively, as another example, when the processor is embodied as an executor of software instructions, the instructions may specifically configure the processor to perform the operations described herein.

In order to provide deployment of a communication system (e.g., a LTE system) in an unlicensed band without blocking other systems, an example embodiment may provide a flexible time sharing scheme on an unlicensed band, as shown in FIG. 5.

Referring now to FIG. 5, a diagram illustrating a proposed time sharing scheme on an unlicensed band is provided according to an example embodiment. In the example embodiment of FIG. 5, the eNB 12 may determine a secondary cell carrier (SCC) (also referred to herein as unlicensed band 18) transmission ON/OFF pattern based on measurements on a license exempt band. In this regard, based in part on this data, the eNB 12 may generate planned ON and OFF durations that may be communicated to one or more UEs 14 prior to the UEs 14 usage of the SCC. In an example embodiment, the eNB 12 may measure one or more energy levels of one or more channels (e.g., wireless mediums) of the unlicensed band 18 to determine the SCC transmission ON/OFF pattern. During the planned OFF duration, the eNB 12 may not communicate or transmit (e.g., an LTE transmission(s)) data to one or more UEs 14 in the unlicensed band 18.

Although the eNB 12 may determine and generate a plan for a SCC ON/OFF transmission pattern, there may be instances in which the SCC allows transmissions via one or more channels even during a period designated as OFF by the eNB 12. In this regard, the eNB 12 may continue or may keep measuring a channel(s) of the SCC to ensure that a channel(s) in the unlicensed band 18 is free for usage. In an instance in which the eNB 12 continues to detect a channel(s) of the unlicensed band 18 after the planned OFF duration and determines that the channel(s) is free, the eNB 12 may transmit data to the UEs 14 on the free channel(s) of the unlicensed band 18 during the planned ON duration.

On the other hand, in an instance in which the eNB 12 determines that a channel(s) of the unlicensed band 18 is not free (for example, the channel(s) is still being used by devices of the unlicensed band 18) after a planned OFF duration for a time period associated with a duration of t_off (also referred to herein as t_offset), the eNB 12 may generate an OFF trigger which may be sent to one or more UEs 14. The OFF trigger sent to the UEs 14 may instruct the UEs 14 to remain off or not turn on in the unlicensed band 18 during the planned ON duration. The OFF trigger may be sent to the UEs 14 by the eNB 12 via a primary cell carrier (PCC) such as, for example, the licensed band (e.g., cellular) of network 10. In this regard, the one or more UEs 14 may remain off in the unlicensed band 18 for the time period associated with t_off and the eNB 12 may continue to detect the channel(s) of the unlicensed band 18 to determine if the channel(s) is free/available. In an instance in which the eNB 12 determines that the channel(s) is free/available upon the expiration of the time period associated with t_off, the UEs 14 may turn on during a planned ON duration that is offset by t_off and may receive transmissions from the eNB 12 via the free channel(s) of the unlicensed band 18. On the other hand, in an instance in which the eNB 12 determines that the channel(s) is still not free/available upon the expiration of a time period associated with t_off, the eNB 12 may send another OFF trigger to one or more of the UEs 14 instructing the UEs 14 to remain off in the unlicensed band 18 for another time period associated with t_off and this process may be repeated till the eNB 12 determines that the channel(s) is free/available upon expiration of a t_off.

In an alternative example embodiment, the UEs 14 may perform blind detection to determine whether a channel(s) of the SCC is free as opposed to relying solely on the planned ON duration, generated by the eNB 12, for triggering of the usage of a channel(s) in a SCC. In this regard, the UEs 14 may determine whether there is an eNB LTE transmission by detecting a valid LTE signal(s) (e.g., a CRS(s) (common reference signal(s)), DRS(s) (dedicated reference signal(s), PSS(s)/SSS(s) (Primary synchronization signal(s)/secondary synchronization signal(s)), etc.) indicating that a channel is currently occupied by a LTE eNB transmission. In other words, the UEs 14 may determine if an LTE transmission is ON by detecting a valid LTE signal(s). The location and sequence of a CRS(s) may be known to UEs 14, and the UEs 14 may be able to identify whether a signal is a Wifi signal or an LTE signal. These signals (e.g., LTE signals) may be sent by an LTE eNB (e.g., eNB 12) to the UEs 14 in the unlicensed band (e.g., unlicensed band 18) of the SCC.

In an instance, in which a UE(s) 14 detects the valid LTE signal (e.g., reference signal) from the eNB 12, the UE(s) 14 may turn on in the unlicensed band 18 and may communicate with the eNB 12 via a corresponding channel(s). In this regard, receipt of the reference signal may trigger one or more corresponding UEs 14 to turn on and communicate with the eNB 12 via a channel(s) of the unlicensed band 18. The receipt of the reference signal triggering a UE(s) 14 to turn on and communicate with the eNB 12 via a channel(s) of the unlicensed band 18 may be referred to herein as blind detection (also referred to herein as a blind detection method). In an example embodiment, a UE(s) 14 that detects the reference signal (e.g., LTE signal) sent from an eNB 12 in the unlicensed band 18 may result in a delay such as, for example, a blind detection delay period before turning on and utilizing a free channel(s) in the unlicensed band, as shown in FIG. 5. After the delay period, caused by UE detection, the UE(s) 14 may turn on in the unlicensed band 18 for an effective ON duration. In an example embodiment, the effective ON duration may be designated and provided to a corresponding UE(s) 14 by the eNB 12.

The effective ON duration may be shorter than the planned ON duration by an amount of time corresponding to the time period associated with the blind detection delay. In response to expiration of a time period associated with the effective ON duration, a corresponding UE(s) 14(s) may turn off in the unlicensed band 18 (for example, discontinuing usage of the channel(s) in the unlicensed band 18) for the time period associated with the planned OFF duration, as shown in FIG. 5. In addition, a UE(s) 14 may remain off in the unlicensed band 18 an additional amount of time after a planned OFF duration for a predetermined time period (for example, a time period corresponding to t_off) in an instance in which the UE(s) 14 may receive an OFF trigger from the eNB 12.

In another example embodiment, one or more UEs 14 may determine that a channel(s) is free for usage in the unlicensed band 18 in response to receiving an explicit ON trigger sent from the eNB 12. The explicit ON trigger may be sent by the eNB 12 to one or more UEs 14 via the FCC such as, for example, the licensed band (e.g., cellular) of network 10. In an example embodiment, a UE(s) 14 receiving the explicit ON trigger may not be able to utilize the channel of the unlicensed band 18 to communicate with the eNB 12 until expiration of a time period such as, for example, a signaling delay time period, as shown in FIG. 5. Upon expiration of the time period associated with the signaling delay, one or more corresponding UEs 14 may receive communications (e.g., LTE eNB communications) from the eNB 12 via a channel(s) of the unlicensed band 18 for an effective ON duration period. This effective ON duration may be shorter than the planned ON duration by an amount of time corresponding to the signaling delay time period. In response to expiration of the effective ON duration period, the corresponding UEs 14 may stop usage of the channel(s) and may turn off in the unlicensed band 18 during the planned OFF duration. Additionally, one or more corresponding UEs 14 may remain off in the unlicensed band 18 an additional amount of time after a planned OFF duration for a predetermined time period (for example, a time period corresponding to t_off) in an instance in which the UE(s) 14 may receive an OFF trigger from the eNB 12.

Referring now to FIG. 6, a diagram illustrating an example of a fixed pattern ON/OFF planned duration for SCC transmission is provided according to an example embodiment. FIG. 6 illustrates a fixed relationship between an ON and OFF pattern of a SCC as generated by an eNB 12 (e.g. an LTE eNB). The fixed ON and OFF pattern may correspond to a fixed ON/OFF timeframe. However, the eNB (e.g., eNB 12) may be unable to guarantee that a channel(s) of the SCC (e.g., unlicensed band 18) may be used in every ON time period, as described above, since the eNB at the time of generating the SCC transmission ON/OFF duration pattern, may be unsure whether another system (e.g., Wifi system, WLAN system, TVWS system, etc.) may be using a channel(s) in the SCC during an ON time period planned for usage by a UE(s) 14.

In the example embodiment of FIG. 6, during the first planned ON period, the eNB 12 may determine that one or more Wi-Fi devices (e.g., WiFi APs) are transmitting on the unlicensed band 18. In this regard, the eNB 12 may inform all UEs 14, in a system, via the licensed band of the FCC that the UEs may not use the channel(s) in the unlicensed band during the planned ON period because the channel(s) is currently being utilized by the Wifi devices. As such, the eNB 12 may send the OFF trigger command to each of the UEs 14 of a system so that each of the UEs 14 may know that unlicensed band 18 is not going to be utilized by the UEs during the first planned ON period and that the UEs 14 should wait for the next ON time period to utilize the unlicensed band 18. As such, in the example embodiment of FIG. 6, the eNB 12 may set the t_off equal to the first ON period, so that the UEs 14 may be informed to wait longer to turn on in the unlicensed band 18 and utilize a channel of the unlicensed band 18 for communication with the eNB 12.

Referring now to FIG. 7, a diagram illustrating a manner in which to turn on transmission in an unlicensed band SCC is provided according to an example embodiment. In the example embodiment of FIG. 7, the eNB 12 may set t_off to 0 and an OFF trigger may not be utilized. Instead, the UEs 14 may wait for receipt of an ON trigger from eNB 12 or may perform blind detection in order to turn on transmission via an unlicensed band 18. In this regard, the approach of FIG. 7 may be more flexible than in the example embodiment of FIG. 6, since the UEs may not necessarily need to follow a planned ON/OFF duration for SCC transmission in the example embodiment of FIG. 7.

Referring now to FIG. 8, a flowchart of an example embodiment of an apparatus enabling flexible time sharing on an unlicensed band is provided. At operation 800, an apparatus (e.g., eNB 12) may determine an SCC transmission ON/OFF duration plan beforehand such as, for example, prior to communicating with one or more UEs about the SCC. At operation 805, an apparatus (e.g., eNB 12) may inform one or more unlicensed band capable UEs (e.g., UEs 14) about the planned ON/OFF duration. The apparatus may inform the unlicensed band capable UEs about the planned ON/OFF duration via radio resource control (RRC) or media access control (MAC) signalling. At operation 810, an apparatus (e.g., eNB 12) may detect an unlicensed band (e.g., unlicensed band 18) SCC medium (e.g., a channel) to check whether the medium is free or busy for a duration of duration_free_right before a planned OFF duration expires. The duration_free_min value may be determined by the apparatus (e.g., eNB 12). At operation 815, an apparatus (e.g., eNB 12) may turn ON transmission after an OFF duration (e.g., a planned OFF duration) in response to determining that the medium is free (e.g., available for usage by the apparatus). At operation 820, an apparatus (e.g., eNB 12) may pause or suspend the SCC transmission of a planned ON duration in response to determining that the medium is busy (e.g., another system is using the medium). In an example embodiment, an apparatus (e.g., eNB 12) may signal an OFF trigger to the UEs (e.g., UEs 14) to pause detection for a duration of t_off. The apparatus (e.g., eNB 12) may determine the t_off duration based in part on one or more measurements, including but not limited to, measurements of an activity level, power level, traffic loads, etc. Additionally or alternatively, the apparatus (e.g., eNB 12) may determine that the medium is busy in response to obtaining current transmission (e.g., Wifi current transmission) duration information via a non cellular modem 23 of the apparatus communicating with one or more devices (e.g., second terminals 16 (e.g., Wifi APs)) of another system using the medium of the unlicensed band. At operation 825, an apparatus (e.g., eNB 12) may keep on or continue detecting the medium and turn ON after detecting that the medium is free for a predetermined time period corresponding to duration_free_min.

At operation 830, after an apparatus (e.g., eNB 12) turns on the SCC transmission via the SCC, the apparatus may inform one or more unlicensed band capable UEs (e.g., UEs 14) that the medium may be utilized for transmissions. In an example embodiment, the apparatus may inform the UEs that the SCC transmission is ON via one or more explicit ON trigger signalling messages. The apparatus may provide the explicit ON trigger messages to the UEs via a FCC (e.g., a licensed band (e.g., cellular band) of a network 10). Alternatively, the apparatus (e.g., eNB 12) may turn on transmission (e.g., LTE transmission) immediately and may wait for one or more UEs blind detection of a SCC's valid LTE signal (e.g., a LTE reference signal(s) or a SCH on unlicensed band SCC. In an example embodiment, the SCC reference signal may be transmitted by the apparatus to the UEs via the SCC and the UEs 14 may detect if the SCC reference signal (e.g., a LTE signal) is valid by analyzing the location and sequence, which may be unique for LTE. Additionally or alternatively, the apparatus (e.g., eNB 12) may request one or more UEs to provide feedback confirmation to the apparatus after a successful blind detection of a valid LTE signal (e.g., an LTE reference signal). In another alternative example embodiment, the apparatus (e.g., eNB 12) may inform one or more UEs (e.g., UEs 14) that the SCC transmission is ON via a higher layer (e.g., layer 1 (L1)) signalling of an ON pattern. In this regard, the apparatus (e.g., eNB 12) may turn on transmission (e.g., LTE transmission) when the ON pattern is started. In this regard, the UEs may turn ON according the pattern configured if no OFF_trigger is received by the UEs.

At operation 835, an apparatus (e.g., eNB 12) may, during the ON duration, use the spectrum of an unlicensed band (e.g., unlicensed band 18) SCC to communicate (e.g., via a channel) with one or more UEs (e.g., UEs 14). The apparatus may, but need not, communicate with the UEs via an inter-band carrier aggregation mechanism (e.g., an LTE inter-band carrier aggregation mechanism). At operation 840, an apparatus (e.g., eNB 12) may shut off SCC transmission with an unlicensed band after an ON period (e.g., a planned ON duration). At operation 845, an apparatus (e.g., eNB 12) may detect an unlicensed band SCC medium to check if it is free or busy for a duration before a planned OFF duration expires at operation 810.

Referring now to FIG. 9, a diagram illustrating a flowchart of an example embodiment enabling receipt of transmissions in an unlicensed band according to a flexible time sharing approach is provided. Optionally, at operation 900, an apparatus (e.g., a UE 14) may keep an unlicensed band SCC (e.g., unlicensed band 18) inactive in response to receiving an OFF trigger after a planned OFF duration period. In response to receiving an OFF trigger, an apparatus (e.g., UE 14) may wait for time period corresponding to a t_off duration before communicating via the unlicensed band SCC. In an example embodiment, the t_off value may be configured by higher layer signalling or included in the OFF trigger by an eNB (e.g., eNB 12).

Optionally, at operation 905, in an instance in which an apparatus (e.g., a UE 14) did not receive an OFF trigger or a t_off duration expiring after the receipt on an OFF trigger, from an eNB, the apparatus (e.g., a UE 14) may activate the unlicensed band SCC after an ON trigger is received from the eNB, via the PCC. In an alternative example embodiment, in an instance in which the apparatus (e.g., a UE 14) did not receive an OFF trigger, or a t_off duration passed after the receipt of an OFF trigger from an eNB, the apparatus (e.g., a UE 14) may activate the unlicensed band SCC and may start blind detection upon receipt of a reference signal (e.g., a LTE reference signal) or in an instance in which a PSS/SSS (Primary Synchronization Signal/Secondary Synchronization signal) is detected. In this regard, the apparatus (e.g., UE 14) may begin transmitting or receiving data (e.g., an LTE frame) on the unlicensed band (e.g., unlicensed band 18) SCC.

In another alternative example embodiment, an apparatus (e.g., UE 14) may start transmitting or receiving data (e.g., an LTE frame) on the unlicensed band SCC in response to a start of a configured ON pattern in an instance in which no OFF trigger is received by the apparatus, otherwise, the apparatus may wait for a next ON pattern to transmit/receive data via the unlicensed band SCC. At operation 910, after an ON duration period, an apparatus (e.g. UE 14) may deactivate the communications with the unlicensed band SCC in an instance in which a planned OFF duration starts.

In an example embodiment, sensing as to whether a wireless medium of an unlicensed band SCC is free may be performed, for example, by an eNB or an UE, by setting a time period corresponding to a duration_free_min equal to a duration (e.g., 32 µs) of a Distributed Coordination Function (DCF) InterFrame Space (DIFS). This may allow a minimum sensing measuring window of about 32 µs free of Wifi interference. In an instance in which the wireless medium is not very busy, larger values for duration_free_min may be used to enhance sensing performance. An eNB (e.g., eNB 12) or optionally a UE (e.g., UE 14) may implement such a sensing measuring window with an energy detector (e.g., non cellular modem 23, non cellular modem 42) based on a sliding correlator and comparison of peak detection to some arbitrary threshold level.

In some example embodiments, the SCC transmission ON/OFF duration generated by an eNB (e.g., eNB 12) may be adaptively adjusted. In this regard, a duration value adjustment may be designed, by an eNB, based in part on: (1) load information interaction, an interference level, a measurement activity level of a Wifi system during an OFF duration; and/or (2) an effective acquierement delay (e.g., an LTE effective acquierement delay), an eNB (e.g., eNB 12 (e.g., an LTE eNB)) making an adjustment on the ON/OFF value.

The eNB 12 may adjust an ON/OFF value based on an absolute adjustment and/or a relative/accumulated adjustment. An eNB may utilize an absolute adjustment by defining a new ON/OFF duration directly and signalling the new ON/OFF duration to one or more unlicensed band capable UEs (e.g., UEs 14). On the other hand, an eNB may utilize a relative adjustment by predefining the ON/OFF pattern based on experiences, e.g., an initial ON/OFF value.

In some example embodiments, the eNB 12 may increase/ decrease an ON duration and may decrease/increase an OFF duration by a certain step size which may be sent to unlicensed band capable UEs (e.g., UEs 14) via signalling in a PCC (e.g., a licensed band (e.g., cellular) of a network 10). Additionally, the eNB 12 may set a minimum OFF duration value and a maximum ON duration value. In an example embodiment, in an instance in which the minimum OFF duration value is reached, a further increase of an ON duration may not be permitted and a further decrease of an OFF duration may not be permitted.

Additionally, in some example embodiments, the latest or most recent ON/OFF results may be applied/communicated to an unlicensed band system (e.g., a Wifi system, another operator's LTE system, etc.) as well in an instance in which there is a possible interaction gateway between an eNB and an access point (e.g., Wifi AP (e.g., second terminal 16)) of the unlicensed band system through a backhaul or air interface.

Referring now to FIG. 10, a diagram illustrating an UE assisted wireless medium reservation procedure is provided according to an example embodiment. In the example embodiment of FIG. 8, the eNB 12 may request one or more of the UEs 14 to compete for a wireless medium (WM) of a SCC using the non-cellular modem 42 (e.g., a WiFi modem) of the UEs 14. In this regard, the UEs 14 may reserve a WM (e.g., a channel(s)) of an unlicensed band (e.g., unlicensed band 18) using the non-cellular modem 42 and may indicate to the eNB 12 its WM reservation status via an uplink (UL) downlink control information (DCI) format. In an example embodiment, upon receiving the WM reservation status feedback after a delay $T_a$ (e.g., 4 ms), the eNB 12 may send an explicit ON trigger command to each of the UEs 14 (e.g., including a measuring UE 14) of a system (e.g., system 7), which may then implicitly activate the SCC corresponding to an unlicensed band. In an example embodiment, the UEs 14 may utilize their non-cellular modem 42 to communicate with one or more Wifi APs (e.g., second terminals 16) to determine when the Wifi APs are scheduled to use the WM and based on this information, the UEs may reserve a WM of an unlicensed band during a time that the Wifi stations are not using the WM. The UEs 14 may provide this WM reservation information to the eNB 12 so that the eNB 12 may determine the WM reservation status of an unlicensed band.

By determining the WM reservation status of an unlicensed band, the eNB 12 may utilize this information to determine a length of time that one or more WiFi APs (e.g., Wifi stations (for example, second terminals 16)) are planning to use a WM in an unlicensed band (e.g., unlicensed band 18). In this regard, the eNB 12 may utilize Wifi signaling information pertaining to the WM reservation status to reconfigure a contention window such that the eNB 12 may know how long to wait until a next opportunity for allowing the UEs 14 to utilize the WM (e.g., a channel(s)) on the unlicensed band. As such, the eNB 12 may designate the time that one or more Wifi APs are using the WM as a t_off.

In this regard, the ON/OFF duration of a planned SCC transmission generated by the eNB 12 may be flexibly adjusted by the eNB 12 based on a WM reservation status report. Such a WM reservation status report may be generated during a contention window in a Carrier-Sense Multiple Access (CSMA) Collision Avoidance (CA) protocol, by the eNB 12 (for example, via non-cellular modem 23 (e.g., a Wifi modem)) or alternatively by a UE(s) 14 (for example, via the non-cellular modem 42 (e.g., a Wifi modem)).

In an instance in which a UE(s) 14 may generate the WM reservation status report via a non-cellular modem 42, the corresponding UE(s) 14 may utilize a UL DCI format message to send the WM reservation status report to the eNB 12. In this regard, the eNB 12 may know the start of a next contention window as shown in FIG. 11 and may adjust or set the ON/OFF duration of a planned SCC transmission accordingly.

Referring now to FIG. 11, a diagram illustrating one or more contention windows according to an example embodiment is provided. In the example embodiment of FIG. 11, the eNB 12 may configure each of the UEs 14 of a system (e.g., system 7) to be activated for a next contention window opportunity. In other words, t_off may be set by the eNB 12 to the T_wm1, T_wm2, T_wm3 contention windows, as shown in FIG. 11 which may correspond to a duration value determined based on the Wifi signaling of one or more Wifi APs (e.g., Wifi stations). In an example embodiment, the timing adjustment with sensing based on using the non-cellular modem 42 of a UE(s) 14 may be beneficial since sensing of the transmission of other WiFi APs (e.g., Wifi stations (for example, second terminals 16)) may be optimized for WiFi parameters (e.g., sensing using a slot-based PLCP preamble detection during a contention window to determine the WM reservation and a start of a next contention window, or a WiFi activity sensing during a Distributed Coordination Function (DCF) InterFrame Space DIFS) may be optimally performed.

As shown in FIG. 11, the eNB 12, by utilizing the WM reservation status report may be informed or may determine that during the first three contention windows (e.g., T_wm1, T_wm2 and T_wm3) the wireless medium is being used by one or more Wifi stations (e.g., Wifi APs) and that after the third contention window, the wireless medium (e.g., a channel(s)) of an unlicensed band (e.g., unlicensed band 18) may be free and available for usage by the eNB 12 (e.g., an LTE eNB 12). For example, based in part on the WM reservation status report, the eNB 12 may determine that Wifi station C (e.g., a second terminal 16) is occupying the wireless medium during the first contention window 1 (e.g., T_wm1) and as such the eNB 12 may trigger t_off (e.g., t_off 2) for the first contention window. Additionally, the eNB 12 may determine that Wifi station D (e.g., a second terminal 16) is occupying the wireless medium during the second contention window (e.g., T_wm2) and as such the eNB 12 may trigger t_off (e.g., t_off 4) during the second contention window. Further, the eNB 12 may determine that Wifi station E (e.g., a second terminal 16) is occupying the wireless medium during a third contention window (e.g., T_wm3) and as such the eNB 12 may trigger t_off (e.g., t_off 6) during the duration of the third contention window. During a next contention window, the eNB 12 may determine that the wireless medium is free and in this regard, the eNB 12 may send a message or a trigger (e.g., trigger 8) to the UEs 14 instructing the UEs 14 to utilize the wireless medium of the unlicensed band (e.g., unlicensed band 18) to communicate with the eNB 12.

In order to support a flexible ON mechanism, there may be eNB detection period during which the eNB 12 keeps on sensing a wireless medium (e.g., a channel(s)), and this period may also be an observation period for the UEs 14. In an instance in which an observation duration may be long due to a very busy medium on an unlicensed band, the power consumption of a blind detection may be rather high for UEs 14. Even if using signalling indication from a PCC, a blind detection (e.g., a Physical Control Channel (PDCCH) blind detection) may also be a burden due to higher number of blind detection requirements, and/or the reservation of a control channel elements (CCE) resource might be wasteful. As such, some example embodiments may utilize one or more observation windows, as shown in FIG. 12 to minimize power consumption of the eNB 12 and UEs 14 as well as to enhance performance.

Referring now to FIG. 12, a diagram illustrating one or more observation windows assigned to one or more UEs for performing blind detection according to an example embodiment is provided. In order to reduce the power consumption of the UEs 14, the UEs 14 of a system (e.g., system 7) may be divided into groups, which may be assigned different time patterns of observation windows. The different time patterns of observation windows may be repeated. The eNB 12 may group the UEs 14 and assign the UEs 14 different time patterns of observation. In the example embodiment of FIG. 12, the UEs 14 may need to perform blind detection (e.g., detect a reference signal (e.g., an LTE reference signal)) on an unlicensed band within those short observation windows assigned to groups of corresponding UEs 14. In this regard, in other subframes outside the observation windows, the UEs 14 may be powered OFF. In any instance in which the eNB 12 may detect a free medium of an unlicensed band for a time period associated with duration_free_min, the eNB 12 may be able to identify some available UEs 14. Since the UEs 14 may be powered OFF during subframes outside the corresponding assigned observation windows, each of the UEs 14 may reduce power consumption greatly.

In the example embodiment of FIG. 12, the UEs 7 and 8 may be grouped and assigned, by the eNB 12, an observation window 1 (also referred to herein as observation window 11) and the UEs 1 and 2 may be grouped and assigned an observation window 2 (also referred to herein as observation window 15). Further, the UEs 3 and 4 may be grouped and assigned, by the eNB 12, an observation window 3 (also referred to herein as observation window 17) and the UEs 5 and 6 may be grouped and assigned an observation window 4 (also referred to herein as observation window 19). The observation windows 1, 2, 3, 4 may be repeated, as shown in FIG. 12.

In the example embodiment of FIG. 12, the UEs may only need to perform blind detection within their corresponding observation window. For example, the UEs 7 and 8 may turn on and perform blind detection during the observation window 1 and may turn off during other observation windows (e.g., observation windows 2, 3, 4). The UEs 1 and 2 may turn on and may perform blind detection during observation window 2 and may turn off during other observation windows (e.g., observation windows 1, 3, 4). The UEs 3 and 4 may turn on and perform blind detection during observation window 3 and may turn off during other observation windows (e.g., observation windows 1, 2, 4). Similarly, the UEs 5 and 6 may turn on and perform blind detection during observation window 4 and may turn off during other observation windows (e.g., observation windows 1, 2, 3).

This approach of using observation windows for UEs may be efficient since the UEs may wake up, or turn on, in different time intervals, as shown in FIG. 12. In the example embodiment of FIG. 12, the UEs 7 and 8 may wake up the earliest among the UEs of the example embodiment of FIG. 12. As such, in a subsequent observation window, the UE 1 and UE 2 may wake up and perform blind detection, the UE's 5 and 6 may wake up and perform blind detection in a subsequent observation window and the UE's 5 and 6 may wake up last and perform blind detection. In this regard, in an instance in which the eNB 12 identifies an available channel in an unlicensed band for a time period corresponding to duration_free_min, the eNB 12 may be able to communicate with some of the UEs that are awake and may inform these UEs of the available channel for usage. As other UEs wake up in their corresponding observation window, the eNB 12 may inform these UEs of the available channel for usage in the unlicensed band.

Some example embodiments, may improve the reliability of explicit Layer 1 (L1) signaling of an ON and OFF trigger as well as UE blind detection. For example, in an instance in which an ON trigger or an OFF trigger (e.g., an OFF trigger including information denoting a t_off, a next ON/OFF duration, etc.) may be missed, or lost by a particular UE or may be mis-decoded upon receipt by a corresponding UE, the UE may miss a next start of an ON duration. Also, since an eNB (e.g., eNB 12) may not be aware that a UE missed the start of an ON duration, the eNB may incorrectly schedule communications of a corresponding UE 14 in an unlicensed band in an instance in which the UE 14 may have not began transmitting and/or receiving data in the unlicensed band (e.g., unlicensed band 18).

In other words, for example, if an OFF trigger is not detected by some of the UEs 14, the UEs 14 may incorrectly begin transmitting/receiving in unlicensed band of a SCC. However, since there may be no transmission from an eNB, the UEs 14 may determine that the OFF trigger may be missed and may turn off automatically. Alternatively, a blinddetectionTimer may be defined for these UEs 14. In an instance in which the blinddetectionTimer may expire, and the UE(s) 14 did not detect a transmission (e.g., LTE transmission), for example, the UE(s) 14 may assume the trigger is missed and may power off. In an instance in which an OFF trigger may also include information such as t_off, or a next ON/OFF duration, the UE(s) 14 may also miss an instance in which a next ON duration may begin. In such a case, the reliability of an OFF trigger may be improved. Similarly, in an instance in which an ON trigger is not detected by some UEs 14, these UEs 14 may not start transmitting/receiving in an unlicensed band of a SCC when they should. Also, these UEs 14 may miss the time when a next ON duration may begin.

In this regard, an example embodiment may improve the reliability for a UE(s) 14 by enabling a UE to send confirmation feedback to the eNB for successful detection of the triggers (e.g., an ON trigger(s) (e.g., an explicit ON trigger(s)), an OFF trigger(s), etc.), and/or for a successful blind detection. In this regard, a UE 14 may feedback a conformation message to an eNB (e.g., eNB 12) via a PCC Physical Uplink Channel (PUCCH) or a Physical Uplink Shared Channel (PUSCH) resource for a trigger(s) that is correctly received, or for a successful blind detection. On the other hand, in an instance in which no confirmation feedback is received by the eNB, the eNB may send a trigger(s) again to a UE(s) 14. The resource for such a conformation may be configured from a higher layer and may, but need not, be time linked to a defined observation window. In an instance in which the confirmation message is received by the eNB, the eNB may begin to schedule the UE(s) 14 on an unlicensed band of a SCC (e.g., unlicensed band 18).

Referring now to FIG. 13, a diagram illustrating a starting subframe according to an example embodiment is provided. In an instance in which an eNB (e.g., eNB 12) may trigger a new start of an ON period, a UE(s) 14 may need time to obtain frequency tuning (e.g., time fine tuning) and synchronization before the UE(s) 14 is able to receive and transmit properly. Also continuous transmission over time may be needed for a UE(s) 14 in order to avoid unnecessary transmission collisions with another system(s) (e.g., a Wifi system, WLAN system, etc.).

For instance, an eNB (e.g., eNB 12) may be turning on and off and when it turns on again (for e.g., via an ON trigger during an ON period) and communicates with a UE(s) 14, the UE(s) 14 may need some time to synchronize and to compensate for the frequency. On the other hand, continuous transmissions may be needed because if there is any gap in the transmissions from the eNB (e.g., eNB 12 (e.g., an LTE eNB)) another system such as, for example, a Wi-Fi system in an unlicensed band may begin transmitting on the channel being utilized by the UEs 14 in an unlicensed band, in an instance in which the Wifi system determines that the UEs 14 are not transmitting on the channel. As such, an eNB (e.g., eNB 12) may need to continue transmitting to the UEs 14 even though the UEs 14 may not be scheduled yet by the eNB and may not be synchronized in order to avoid another system such as, for example, a Wifi system transmitting via a channel of the unlicensed band.

In this regard, the starting subframe of the example embodiment of FIG. 13 may be utilized to allow the UEs 14 enough time to obtain the frequency and synchronization information and to keep the channel occupied to avoid unnecessary collision with another system(s). In this regard, some example embodiments may utilize all or some types of reference signals (RS) (for example, RSs from Rel-8110 of an LTE system). In an alternative example embodiment, all Reference signals (RSs) Resource elements (REs) may use a CRS signal format.

In this regard, one or more pilots (e.g., LTE pilots) of the reference signals may be utilized in the starting subframe to occupy all the time slots to keep the transmission across a channel in an unlicensed band active for a time period needed for a UE(s) 14 to be scheduled as well as to synchronize and obtain frequency information. For purposes of illustration and not of limitation, the pilots of the example embodiment of FIG. 13 may, but need not, be R0, R1, R2 and R3 of a system (e.g., an LTE system). However, any other suitable pilots may be utilized without departing from the spirit and scope of the invention. In the example embodiment of FIG. 13, a high density of the pilots (e.g., LTE pilot signals) may be utilized to ensure for each symbol (e.g., S0-S13) for the subcarriers (e.g., C1-C12) that there are some pilots with enough signal power on each symbol to keep the channel, about to be scheduled for usage via the UEs 14 by the eNB 12, active so that another system does not determine that the channel is free. Also, these pilots may be utilized so that the UEs 14 may obtain frequency information and synchronize faster.

It should be pointed out that in the example embodiment of FIG. 13, the pilots P1, P2, and R7 may be utilized for different modes (e.g., LTE modes) and in this regard these pilots are not included in the same symbols as the pilots R0, R1, R2 and R3. In an instance in which the eNB 12 gets confirmation that some of the UEs 14 are synchronized and have frequency information, the eNB 12 may start transmitting and scheduling the UEs 14 and may stop using the high density pilots of the starting sub frame. In this regard, the eNB 12 may transmit as normal in the unlicensed SCC (for e.g., according to normal Rel-10 LTE system signaling).

In an alternative example embodiment, in an instance in which there is no reference signal(s) in each symbol of the starting subframe, an eNB (e.g., eNB 12) may transmit items (e.g., signals) of dummy data via a channel of an unlicensed band to one or more UEs 14 to keep the channel busy, so that it may not be utilized by another system (e.g., a Wifi system). In another alternative example embodiment, an eNB may utilize a Synchronization Channel (SCH) to enable faster timing synchronization for one or more UEs 14.

In the example embodiment of the starting subframe of FIG. 13, a CRS for ports 0-4 may occupy 0, 1, 4, 7, 8, 11, and a DRS for port 7 may occupy 2, 3, 9, and 10. Additionally, another kind of RS such as a channel state information—reference signal (CSI-RS) may be set on symbol 5, 6, 12, and 13. In an example embodiment, there may be different configurations of different type of combinations of RS types for a starting subframe. For example, a starting subframe of an example embodiment may be configurable based in part on: (1) the duration of starting subframe(s); (2) the configuration of a corresponding reference signal (RS) (e.g., type of RS, density, bandwidth, etc.); (3) the presence of a synchronization channel (SCH); and (4) any other suitable configurations.

To support the configurations, content of an ON trigger may include, but is not limited to configuration data indicating a RS/SCH configuration in one or more starting subframes. Additionally, the content of an ON trigger may indicate a number of starting subframes, a RS pattern, a density, a bandwidth, a presence of a SCH, etc.

Each of the symbols of the starting subframe may have a continuous signal (e.g., a continuous LTE signal) and may avoid CSMA type of system collision. Since there may be little data associated with the common pilots (e.g., LTE common pilots (e.g., R0, R1, R2, R3)) of the starting subframe, the reference signal (RS) power may be increased, or may span an entire bandwidth to achieve better performance. In this regard, in an instance in which there may be residual transmissions from a coexisting system, the interference to the coexisting system may be low due to the sparse RS locations.

Referring now to FIG. 14, a diagram illustrating a tunnel reference signal according to an example embodiment is provided. In the example embodiment of FIG. 14, the eNB 12 may have knowledge of interference of another system(s) or through some interaction signalling, the eNB 12 may determine a channel configuration that a coexisting system in the unlicensed band such as, for example, a Wifi system may be using. In this regard, the eNB 12 may be configured to transmit a signal (also referred to herein as "tunnel reference signal(s)") in one or more Wifi channel gaps, as shown in FIG. 14.

Since the eNB 12 may shut off all channels in an unlicensed band to avoid impact of collision with transmissions (e.g., Wifi transmissions) of another system (e.g., a Wifi system), the UEs 14 may lose time and frequency alignment. In order to enable a quick start for the UEs 14, it may be beneficial to provide some frequency/channel reference signals to the UEs 14 before an ON duration to help the UEs 14 synchronize and obtain channel alignment information faster.

In this regard, the eNB 12 may provide one or more tunnel reference signals in some of the gaps of detected Wifi channels. For example, the eNB 12 may determine upon detection, via its non-cellular modem 23 (e.g., a Wifi modem) that there is some Wifi energy in the unlicensed band (e.g., unlicensed band 18) corresponding to channels of a Wifi system. Based in part on examining the detected Wifi channels, the eNB 12 may determine that there are some gaps between the different Wifi channels and may utilize one or more of the gaps for a short period of time so as to not harm or interfere with the Wifi transmissions by transmitting a tunnel reference signal(s) in the gap(s) of the detected Wifi channels.

The property of the tunnel reference signals may correspond to the location/bandwidth of the tunnel reference signal(s) in the gaps of the Wifi channels shown in FIG. 14. As such, the gaps associated with the locations 25 may be utilized by the eNB 12 for providing the tunnel reference signals because they may not interfere with the Wifi channels (e.g., Wifi channels 2, 7, 12) since the bandwidth of the tunnel reference signals may be small such that they may have little or no impact on the transmissions in the Wifi channels. In the example embodiment of FIG. 14, there may be up to 14 Wifi channels, in the 2.4 GHz band, that the Wifi system may utilize. However, all of the gaps associated with each of the 14 channels may not necessarily be utilized in some example embodiments since some of the Wifi channels may overlap each other. In an alternative example embodiment, the gaps associated with channels 1, 6, and 11 may be utilized by the eNB 12 for transmitting tunnel reference signals to the UEs 14.

In an example embodiment, the non cellular modem 23 (e.g., a Wifi modem) of the eNB 12 may scan the Wifi system and determine whether there is energy in certain bandwidths or certain frequencies, and in this regard may determine that there are some co-existing Wifi channels (e.g., Wifi channels 1-14) being utilized. As such, the non cellular modem 23 of the eNB 12 may identify the gaps of the Wifi channels and eNB may traffic tunnel reference signals in the gaps of the channels. The tunnel reference signals of the example embodiments may include low bandwidth (e.g., low density), low power pilot signals that may keep the UEs 14 transmitting on Wifi channels to keep the channels busy and these signals may also enable the UEs to synchronize and obtain frequency alignment information in a fast and efficient manner. In an example embodiment, the tunnel reference signals may be transmitted continuously in the gaps by the eNB 12 since they may be low frequency signals.

During the Wifi systems utilization of the channels 1-14, the eNB 12 may, but need not, be off in the unlicensed band. However, the eNB 12 may turn on in the unlicensed band and transmit the tunnel reference signals in one or more gaps of the Wifi channels 1-14. In an example embodiment, the properties of the tunnel reference signal may include but are not limited to: (1) a location/bandwidth of one or more tunnel reference signals being in corresponding gaps (also referred to herein as gap bands) of Wifi channels, which may depend on an interference detection of an eNB (e.g., eNB 12) or other source of information about active Wifi channels; (2) the bandwidth of the tunnel reference signals may be small (e.g., 1.4 MHz); (3) the start of one or more tunnel references signal may be a few subframes before a planned ON duration to assist UEs (e.g., UEs 14) to obtain better time/frequency synchronization prior to the triggering of the ON duration; (4) the tunnel reference signals may be transmitted by an eNB until a starting subframe is fully functional; (5) the RS pattern may reuse Rel-10 CRS patterns; (5) the location and duration of a corresponding reference signal pattern configuration may be informed to the UEs (e.g., UEs 14) via a radio resource control (RRC) or media access control (MAC) signalling; and (6) the tunnel reference signals may have a low density to keep the interference with Wifi transmissions low.

Referring now to FIGS. 15A and 15B, diagrams illustrating examples of time alignments for starting subframes are provided. The eNB 12 may align an unlicensed band SCC and a licensed band PCC to simplify the transmission of the eNB 12 and also to simplify the timing tracking of one or more UEs 14. In an example embodiment, the starting timing for an unlicensed band (e.g., unlicensed band 18) SCC may depend on the free time of a channel, which may not be aligned with the timing of a PCC (e.g., the licensed band (e.g., cellular) of network 10).

In the example embodiment of FIG. ISA, the start of a symbol (also referred to herein as sym) timing may depend on the availability of a medium (e.g. a channel). The starting symbol may be a symbol with a smallest time difference. The eNB may start transmission in the unlicensed band after determining that a channel of the unlicensed band SCC is idle, and that the SCC may not necessarily be aligned with timing of a PCC. As such, FIG. 15A illustrates possible PCC/SCC timing relationships, which could be; (1) SCC and PCC timing are by chance aligned and in this regard, the eNB 12 may not need to force alignment of the PCC and SCC timing; (2) SCC's timing is closer to FCC's sym #3's timing; and (3) SCC's timing is closer to FCC's sym #4's timing. In the example embodiment of FIG. 15A, an unlicensed band SCC may start transmitting at any time once a channel in the unlicensed band is detected idle for a duration_free_min time duration.

As shown in FIGS. 15A and 15B, a value of 32 μs, for example, may be used for duration_free_min. Additionally, a value of 71 μs may correspond to a symbol duration of a PCC (e.g., an LTE system of the PCC), as shown in FIGS. 15A and 15B.

In the example embodiment of FIG. 15B, the eNB 12 may, but need not, force a SCC unlicensed carrier to be aligned with the timing of a PCC. In the example embodiment of FIG. 15B, a start of subframe/symbol timing of a SCC may be fully aligned with a PCC, either by chance, or by the eNB 12 transmitting one or more dummy signals via a channel of the unlicensed band SCC. For example, in an instance in which the eNB 12 may determine that the SCC and the PCC are not currently aligned, the eNB 12 may transmit a dummy signal(s) prior to a normal signal transmission (e.g., an LTE signal transmission), as described more fully below. In an instance in which the eNB 12 transmits dummy signals via a channel of the unlicensed band SCC, the channel may be kept busy ensure continuous use and therefore avoid unnecessary collisions with another system(s). For instance, if no dummy signals are transmitted, there may be another system (e.g., a Wifi system) that starts transmitting on the channel, and the eNB 12 may need to wait again till the channel is free/available to use.

FIG. 15B illustrates a few possible timing relationships between an SCC and a PCC such as, for example: (1) SCC and PCC timing may be aligned by chance such that eNB does not need to do anything to force the timing alignment of the SCC and PCC; (2) in an instance in which the eNB 12 has to wait a while before a next full symbol transmission, then the eNB 12 may transmit some dummy signal(s) until the next full symbol transmission occurs; and (3) the eNB 12 may need to wait a while before a next full symbol transmission, and then the eNB 12 may transmit some dummy signal(s) until a next full symbol transmission occurs an instance in which the dummy signal(s) duration is smaller.

In an instance in which eNB 12 may experience difficulty in aligning the timing of the PCC and the SCC, the eNB 12 may transmit a dummy signal(s) (e.g., a reference signal) on unlicensed band SCC till a next starting point of a subframe and may then start transmitting normal data from a symbol such as, for example, symbol #0. This may enable the eNB 12 to align the timing of the PCC with the timing of the SCC since the eNB may transmit dummy signals for an even longer time to start from symbol #0 in order to achieve alignment.

Referring now to FIG. 16, a diagram illustrating utilization of one or more time division duplex (TDD) guard periods according to an example embodiment is provided. The TDD frame format of the example embodiment of FIG. 16 may, but need not be, a LTE TDD frame format for purposes of illustration and not of limitation. The LTE TDD format has a guard period (GP), in which data is typically not transmitted, between downlink (DL) and uplink (UL) transmission, as shown in FIG. 16. In this regard, an eNB (e.g., eNB 12) of an example embodiment may utilize a flexible time sharing scheme when the eNB may be transmitting data to one or UEs (e.g., UEs 14) via a channel(s) in an unlicensed band (e.g., unlicensed band 18), for example. In an instance in which a GP is long, a coexisting system (e.g., a Wifi system) may assume that a channel(s) of the unlicensed band, that is currently being used by the eNB, is free and may start using the channel, which might result in unnecessary collisions between two systems (e.g., an LTE system of the eNB and a Wifi system, etc.).

In order to avoid collisions between two systems, the eNB 12 may configure a special subframe 27 (e.g., special subframe configuration #4, #8 of a TDD frame structure in LTE) when a LTE TDD carrier is utilized in an unlicensed band, as shown in FIG. 16. In the example embodiment of FIG. 16, the special subframe may be configured with a longest Downlink Pilot Time Slot (DwPTS) (for example, which may correspond to a special subframe configuration #4 and #8 of a TDD frame structure in LTE). The DwPTS may correspond to one or more downlink symbols. In the example embodiment of FIG. 16 one or more Uplink Pilot Time Slots (UpPTSs) 29 (e.g., one or more uplink symbols) may be associated with UL transmissions, as shown in FIG. 16. In an example embodiment, the eNB 12 may transmit two or more UpPTSs via a channel of an unlicensed band, so that a coexisting system (e.g., Wifi system) may not determine that the channel in the unlicensed band is free, and so that the coexisting system may not start transmitting again via the channel and cause an unnecessary collision. In other words, the eNB 12 may transmit more than one UpPTS to keep the channel in the unlicensed band busy in order to avoid a collision with a coexisting system.

In an example embodiment, the eNB 12 may determine that the guard period 1 (also referred to herein as gap 1) may be small enough such that a coexisting system such as, for example, a Wifi system, may not determine that the channel in the unlicensed band, being utilized by the eNB 12, is free. For instance, due to a constant N_TA_offset of 624 μs between UL and DL timing in LTE TDD, the gap 1 is approximately 20 μs. However, the short gap 1 may not trigger Wifi transmissions since a shorted Distributed Coordination Function (DCF) InterFrame Space (DIFS) is 34 μs, which is longer than the 20 μs of gap 1. For example, a DIFS may denote that a Wifi station typically has to sense the status of the channel (e.g., a wireless medium) before transmitting if the channel is continuously idle for the DIFS duration (e.g., 34 μs), and if the channel is idle for the DIFS duration then the Wifi station may transmit via the channel. On the other hand, if the channel is found busy during the DIFS duration, the Wifi station should defer its transmission. In the example of FIG. 16, the gap 1 of 20 μs is less than the DIFS duration of 34 μs and as such a Wifi station(s) of a Wifi system may not transmit during gap 1 and as such a collision with the Wifi system may be avoided, by the eNB 12, during gap 1.

On the other hand, the guard period 2 (also referred to herein as gap 2) may be one symbol N_TA_offset which is around 51 μs. As such, since the gap 2 is around 51 μs which is longer than DIFS duration (e.g., 34 μs), the eNB 12 may transmit some dummy data during a portion of the duration of gap 2 to keep the channel of the unlicensed band busy so that the Wifi system may not determine that the channel is free and may not transmit data via the channel to avoid a collision. As such, the eNB 12 may transmit dummy signals (e.g., pilot signals (e.g., LTE pilot signals)) during a portion of the 51 μs duration of gap 2 and when the duration reaches 20 μs, for example, the eNB 12 may use the 20 μs for switching DL and UL before transmitting one or more UpPTSs 29.

Referring now to FIG. 17, a flowchart of an example embodiment of enabling provision of flexible time sharing on an unlicensed band of a secondary cell carrier (also referred to herein as secondary component carrier) is provided according to an example embodiment. At operation 1700, an apparatus (e.g., eNB 12) may generate a secondary cell carrier transmission plan including one or more planned on durations and one or more planned off durations. The planned on durations may correspond to a time period for one or more devices (e.g., UEs 14) to communicate via an unlicensed band (e.g., unlicensed band 18) of the secondary cell carrier. The planned off durations may correspond to a time interval in which the devices may deactivate from the unlicensed band or remain disconnected from the unlicensed band. At operation 1705, an apparatus (e.g., eNB 12) may also enable provision of the plan to the devices (e.g., UEs 14) via a licensed band (e.g., cellular) of a primary cell carrier (also referred to herein as primary component carrier) (e.g., network 10). At operation 1710, an apparatus (e.g., eNB 12) may detect a medium (e.g., a wireless medium (e.g., a channel(s)) of the unlicensed band prior to the expiration of the time period to determine whether the medium is available in order to decide whether to turn on transmissions to the unlicensed band after one of the planned off durations.

It should be pointed out that FIGS. 8, 9 and 17 are flowcharts of a system, method and computer program product according to an example embodiment of the invention. It will be understood that each block of the flowcharts, and combinations of blocks in the flowcharts, can be implemented by various means, such as hardware, firmware, and/or a computer program product including one or more computer program instructions. For example, one or more of the procedures described above may be embodied by computer program instructions. In this regard, in an example embodiment, the computer program instructions which embody the procedures described above are stored by a memory device (e.g., memory 26, memory 36) and executed by a processor (e.g., processor 24, processor 34). As will be appreciated, any such computer program instructions may be loaded onto a computer or other programmable apparatus (e.g., hardware) to produce a machine, such that the instructions which execute on the computer or other programmable apparatus cause the functions specified in the flowcharts blocks to be implemented. In one embodiment, the computer program instructions are stored in a computer-readable memory that can direct a computer or other programmable apparatus to function in a particular manner, such that the instructions stored in the computer-readable memory produce an article of manufacture including instructions which implement the function specified in the flowcharts blocks. The computer program instructions may also be loaded onto a computer or other programmable apparatus to cause a series of operations to be performed on the computer or other programmable apparatus to produce a computer-implemented process such that the instructions which execute on the computer or other programmable apparatus implement the functions specified in the flowcharts blocks.

Accordingly, blocks of the flowcharts support combinations of means for performing the specified functions. It will also be understood that one or more blocks of the flowcharts, and combinations of blocks in the flowcharts, can be implemented by special purpose hardware-based computer systems which perform the specified functions, or combinations of special purpose hardware and computer instructions.

In an example embodiment, an apparatus for performing the methods of FIGS. 8, 9 and 17 above may comprise a processor (e.g., the processor 24, the processor 34) configured to perform some or each of the operations (800-845, 900-910, 1700-1710) described above. The processor may, for example, be configured to perform the operations (800-845, 900-910, 1700-1710) by performing hardware implemented logical functions, executing stored instructions, or executing algorithms for performing each of the operations. Alternatively, the apparatus may comprise means for performing each of the operations described above. In this regard, according to an example embodiment, examples of means for performing operations (800-845, 900-910, 1700-1710) may comprise, for example, the processor 24 (e.g., as means for performing any of the operations described above), the processor 34 and/or a device or circuit for executing instructions or executing an algorithm for processing information as described above.

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Moreover, although the foregoing descriptions and the associated drawings describe example embodiments in the context of certain example combinations of elements and/or functions, it should be appreciated that different combinations of elements and/or functions may be provided by alternative embodiments without departing from the scope of the appended claims. In this regard, for example, different combinations of elements and/or functions than those explicitly described above are also contemplated as may be set forth in some of the appended claims. Although specific terms are employed herein, they are used in a generic and descriptive sense only and not for purposes of limitation.

What is claimed is:

1. A method, comprising:
   generating, by circuitry of an apparatus, a secondary component carrier transmission plan comprising one or more planned on durations and one or more planned off durations, the planned on durations corresponding to a time period for the apparatus and one or more devices to communicate via an unlicensed band on the secondary component carrier and the planned off durations corresponding to a time interval in which the one or more devices deactivate from the unlicensed band or remain disconnected from the unlicensed band;
   providing the plan to the one or more devices via a licensed band of a primary component carrier;
   detecting a medium of the unlicensed band, prior to the expiration of the time period, to determine whether the medium is available to decide whether to turn on transmissions to the unlicensed band after at least one of the planned off durations; and
   suspending, when the medium is determined to be unavailable, at least one of the planned on durations by transmitting a message to the one or more devices, the message including data indicating that the one or more devices is to remain off in the unlicensed band for a predetermined time period.

2. An apparatus, comprising:
   circuitry configured to
      generate a secondary component carrier transmission plan comprising one or more planned on durations and one or more planned off durations, the planned on durations corresponding to a time period for the apparatus and one or more devices to communicate via an unlicensed band on the secondary component carrier and the planned off durations corresponding to a time interval in which the one or more devices deactivate from the unlicensed band or remain disconnected from the unlicensed band;
      provide the plan to the one or more devices via a licensed band of a primary component carrier;
      detect a medium of the unlicensed band secondary cell carrier prior to the expiration of the time period to determine whether the medium is available to decide whether to turn on transmissions to the unlicensed band after at least one of the planned off durations; and
      suspend, when the medium is determined to be unavailable, at least one of the planned on durations by transmitting a message to the one or more devices, the message including data indicating that the one or more devices is to remain off in the unlicensed band for a predetermined time period.

3. The apparatus of claim 2, wherein the circuitry is configured to turn on the transmissions by turning on transmissions to the one or more devices via the medium after expiration of the planned off duration in response to the determination that the medium is available.

4. The apparatus of claim 2, wherein the circuitry is configured to:
   continue detection of the medium upon expiration of the predetermined time period; and
   turn on transmissions to the unlicensed band in response to the determination that the medium is available during a predefined duration.

5. The apparatus of claim 4, wherein the circuitry is configured to inform the one or more devices that the transmissions to the unlicensed band are turned on to enable the one or more devices to utilize the medium.

6. The apparatus of claim 5, wherein the circuitry is configured to inform the one or more devices by sending one or more indications to the one or more devices via the licensed band of the primary component carrier, the indications indicating the turning on of the transmissions to the unlicensed band and triggering the one or more devices to communicate via the unlicensed band.

7. The apparatus of claim 5, wherein
   the circuitry is configured to inform the one or more devices by sending one or more signals via the unlicensed band of the secondary component carrier to enable the one or more devices to detect the signals, and
   the signals, once detected, denote to the one or more devices the turning on of the transmissions to the unlicensed band.

8. The apparatus of claim 7, wherein the circuitry is configured to:

request the one or more devices to acknowledge receipt of the signals; and receive an acknowledgement from at least one of the one or more devices confirming receipt of at least one of the signals.

9. The apparatus of claim 7, wherein the circuitry is configured to turn off the transmissions to the unlicensed band upon expiration of a planned on duration.

10. The apparatus of claim 7, wherein the circuitry is configured to:

analyze a detection period corresponding to a plurality of observation windows in which a different subset of the one or more devices turn on in respective observation windows to detect signals;

enable the subset of one or more devices to turn off in windows outside of an assigned observation window;

detect that the medium is available for a predetermined duration during one of the assigned observation windows;

identify at least one of the one or more devices, of one of the subsets, that turns on during the observation window; and instruct the at least one device to communicate with the unlicensed band.

11. The apparatus of claim 2, wherein the circuitry is configured to:

receive at least one wireless medium reservation report from at least one of the one or more devices, the report indicating one or more windows that communication devices of the unlicensed band are scheduled to use the medium; and transmit on the medium during a time in which the communications devices are not scheduled to use the medium based in part on analyzing data of the report.

12. The apparatus of claim 2, wherein the circuitry is configured to:

transmit a starting sub frame to at least one of the one or more devices during a duration of an period, in which transmissions to the unlicensed band are turned on, the starting sub frame comprising one or more reference signals in one or more symbols to keep the medium busy to avoid collision with at least one other system and to enable the at least one device to synchronize and obtain frequency alignment information.

13. The apparatus of claim 2, wherein the circuitry is configured to:

receive one or more indications of a plurality of channels of the unlicensed band being utilized by one or more communications devices; and transmit, to at least one of the one or more devices, one or more tunnel reference signals in one or gaps of the channels prior to at least one of the planned on durations, the tunnel reference signals enable the device to synchronize and obtain frequency alignment information prior to the planned on duration.

14. The apparatus of claim 2, wherein the circuitry is configured to align a timing of the primary component carrier with a timing of the secondary component carrier based in part on enabling transmission of one or more items of dummy signals on an unlicensed band of the secondary component carrier until a start of a next sub frame of the primary component carrier and enabling transmission of one or more symbols at the start of the next subframe.

15. The apparatus of claim 2, wherein the circuitry is configured to transmit one or more items of dummy data via the medium prior to or during at least one planned on duration, the transmission provided in at least one guard period of a time division duplex frame to keep the medium busy to avoid collision with at least one other system.

16. An apparatus, comprising:

circuitry configured to receive, via a licensed band of a primary component carrier, a generated secondary component carrier transmission plan comprising one or more planned on durations and one or more planned off durations, the planned on durations corresponding to a time period for a network device, the apparatus to communicate via an unlicensed band of the secondary component carrier and the planned off durations corresponding to a time interval in which the apparatus deactivates from the unlicensed band or remains disconnected from the unlicensed band;

receive at least one indication specifying whether transmissions to the unlicensed band are turned on after at least one of the planned off durations; and remain off in the unlicensed band for a predetermined time period in response to a receipt of a message indicating suspension of at least one planned on duration based on a determination that the medium is unavailable.

17. The apparatus of claim 16, wherein the circuitry is configured to receive information indicating that the transmissions to the unlicensed band is turned on to enable utilization of the medium in response to a determination that the medium is available.

18. The apparatus of claim 16, wherein the circuitry is configured to receive a starting sub frame from the network device during a duration of an period, in which transmissions to the unlicensed band are turned on, the starting sub frame comprising one or more reference signals in one or more symbols to keep the medium busy to avoid collision with at least one other system and to enable the at least one apparatus to synchronize and obtain frequency alignment information.

19. The apparatus of claim 16, wherein the circuitry is configured to transmit one or more indications of a plurality of channels of the unlicensed band being utilized by apparatus; and receive one or more tunnel reference signals in one or gaps of the channels prior to at least one of the planned on durations, the tunnel reference signals enable the device to synchronize and obtain frequency alignment information prior to the planned on duration.

20. The apparatus of claim 16, wherein the circuitry is configured to receive one or more items of dummy data via the medium prior to or during at least one planned on duration, the one or more items of dummy data provided in at least one guard period of a time division duplex frame to keep the medium busy to avoid collision with at least one other system.

* * * * *